US006875370B2

(12) United States Patent
Goble

(10) Patent No.: US 6,875,370 B2
(45) Date of Patent: *Apr. 5, 2005

(54) DROP-IN SUBSTITUTES FOR DICHLORODIFLUOROMETHANE REFRIGERANT

(76) Inventor: George H. Goble, 286 W. Navajo, West Lafayette, IN (US) 47906

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 256 days.

(21) Appl. No.: 08/611,258

(22) Filed: Mar. 5, 1996

(65) Prior Publication Data

US 2002/0040975 A1 Apr. 11, 2002

(51) Int. Cl.[7] .................................................. C09K 5/04
(52) U.S. Cl. .............................. 252/67; 62/114; 252/68
(58) Field of Search ............................... 252/67; 62/114

(56) References Cited

U.S. PATENT DOCUMENTS

| 4,303,536 | A | * | 12/1981 | Orfeo et al. | .................. | 252/67 |
|---|---|---|---|---|---|---|
| 4,482,465 | A | * | 11/1984 | Gray | .......................... | 252/67 |
| 4,810,403 | A | * | 3/1989 | Bivens et al. | ................. | 252/67 |
| 4,954,289 | A | * | 9/1990 | Bartlett et al. | ............. | 252/305 |
| 5,061,394 | A | | 10/1991 | Bivens et al. | ................. | 252/67 |
| 5,151,207 | A | * | 9/1992 | Goble | ......................... | 252/67 |
| 5,188,749 | A | * | 2/1993 | Crooker | ...................... | 252/67 |
| 5,214,929 | A | * | 6/1993 | Goble | ......................... | 62/114 |
| 5,277,834 | A | | 1/1994 | Bivens et al. | ................. | 252/67 |
| 5,417,871 | A | | 5/1995 | Minor et al. | .................. | 252/67 |
| 5,425,890 | A | | 6/1995 | Yudin et al. | .................. | 252/67 |
| 6,274,062 | B1 | | 8/2001 | Tieken | | |

FOREIGN PATENT DOCUMENTS

| EP | 0105831 | * | 4/1984 |
|---|---|---|---|
| EP | 619356 | * | 10/1994 |
| GB | 2228739 | * | 9/1990 |
| JP | 3-276052 | * | 12/1991 |
| JP | 5239248 | * | 9/1993 |
| WO | WO 94/00529 | | 1/1994 |

OTHER PUBLICATIONS

Chemical Abs. 117:144968, "Pentahaloethane–Based Chlorofluorocarbon Substitutes and Haloethane", Harris et al, 1992.*

Chemical Abs. 124: 235660, "Conversion of industrial turborefrigerating machines to non–ozone depleting refrigerants", Galeev et al, 1995.*

Chemical Abs. 123: 116088, "Alternatives of chlorofluorocarbons (CFCs)", Rao, 1994.*

Damasceno, Guido de Souza, Dubrouillet, James N., Goldschmidt, Victor W., Robin, Mark, Tree, David R., Testing Refrigerant Alternatives in a Household Refrigerator, Proceedings of the 45th Annual International Appliance Technical Conference (University of Wisconsin, Madison, WI, May 9–11, 1994), IATC, Batavia, IL, pp. 505–516, May 1994 (12 pages with 6 figures and 2 tables, RDB4A29).

Basile et al., Chemical Abstracts, vol. 122, No. 164680, "Quasi–azeotropic mixtures utilizable as refrigerating fluids," EP638623, Feb. 15, 1995, Abstract.

* cited by examiner

Primary Examiner—Margaret Einsmann
(74) Attorney, Agent, or Firm—Clifford W. Browning; Woodard, Emhardt, Moriarty, McNett & Henry LLP

(57) ABSTRACT

A group of known refrigerants, (R-227ea, R-124, R-134a, R-143a, R-125, R-E125, R-E143a, R-E227ca2, R-254cb, R-600a, R-142b, R-22, R-290, R-E170, R-1270, R-1216, R-218, R-C318, R-C270), that may be combined in novel ways to produce several excellent "drop-in" substitutes for refrigerants R-12 or R-500. The performance of the preferred "drop-in" substitutes for R-12 or R-500 of the present invention often exceeds that of the refrigerant being replaced, while maintaining acceptable oil circulation with existing mineral oils used in R-12 or R-500 refrigeration and air conditioning systems.

2 Claims, 15 Drawing Sheets

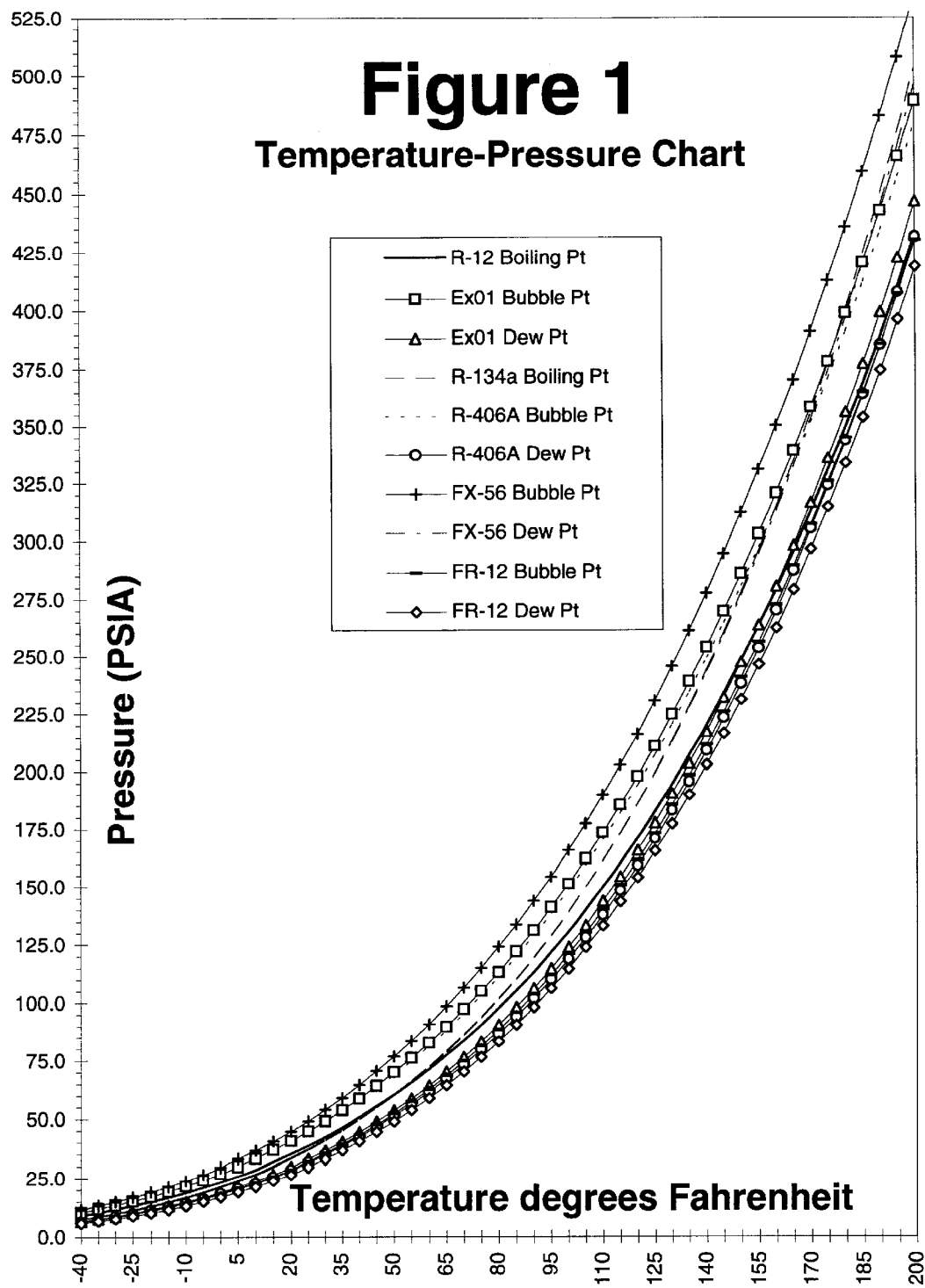

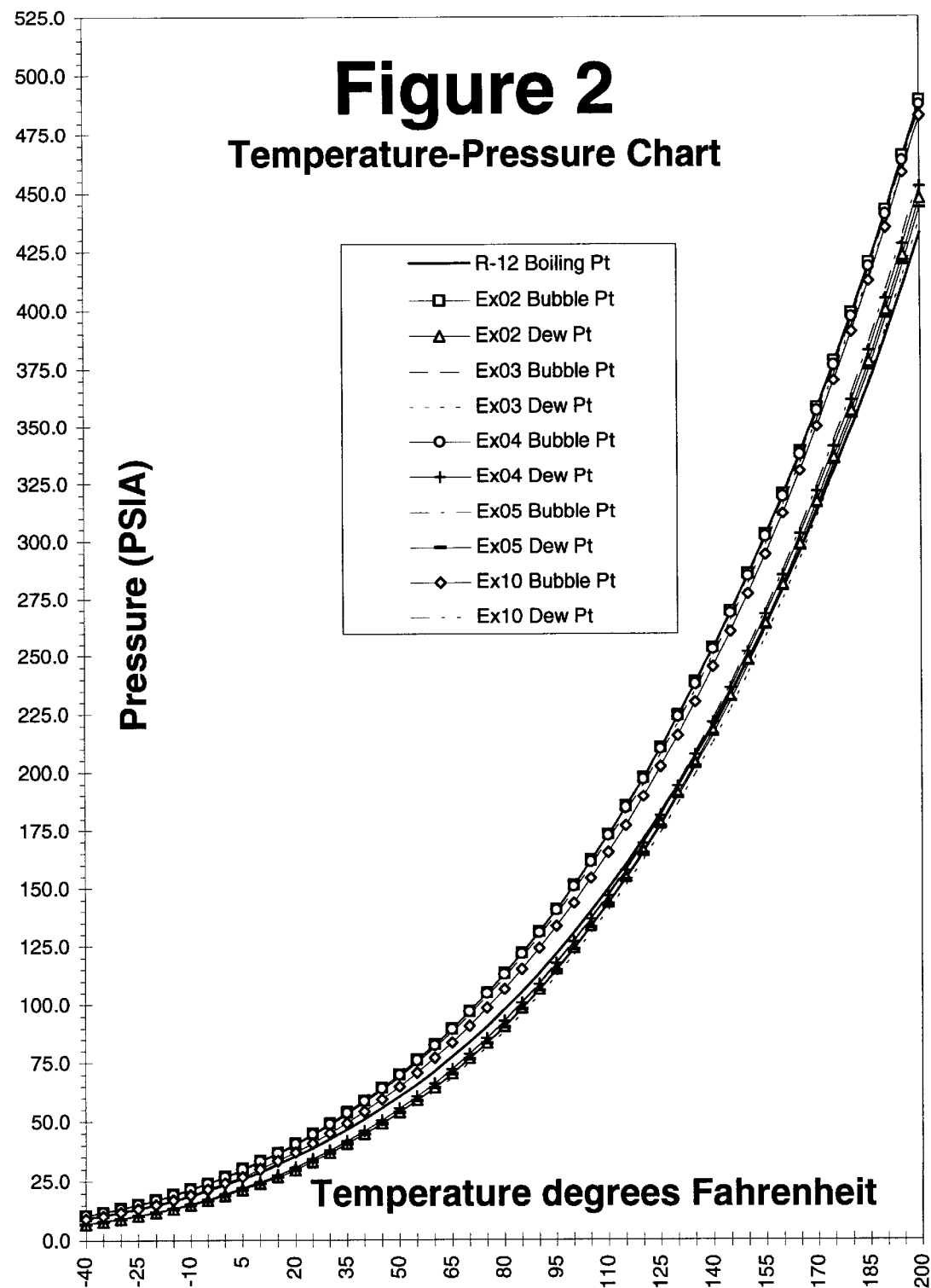

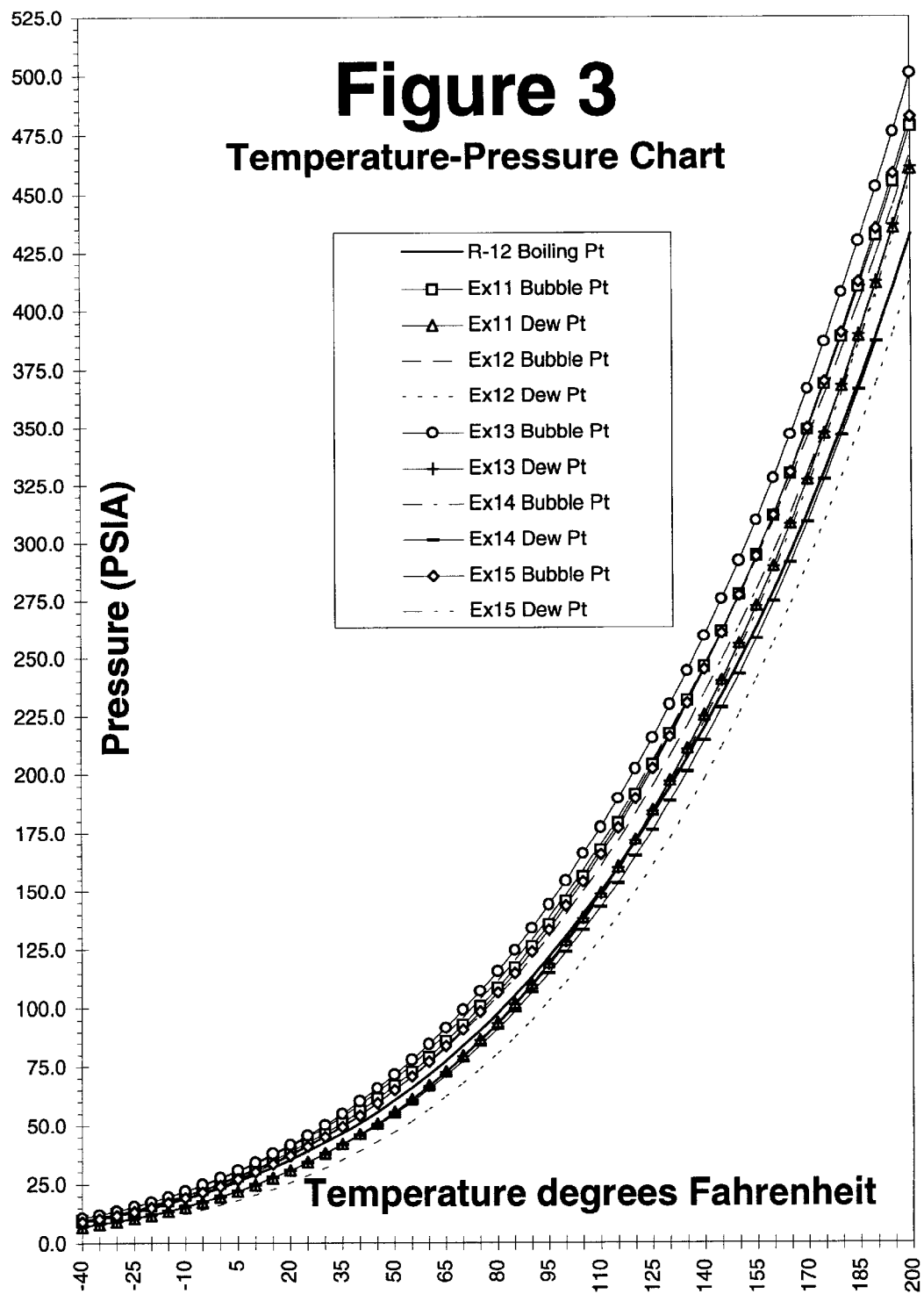

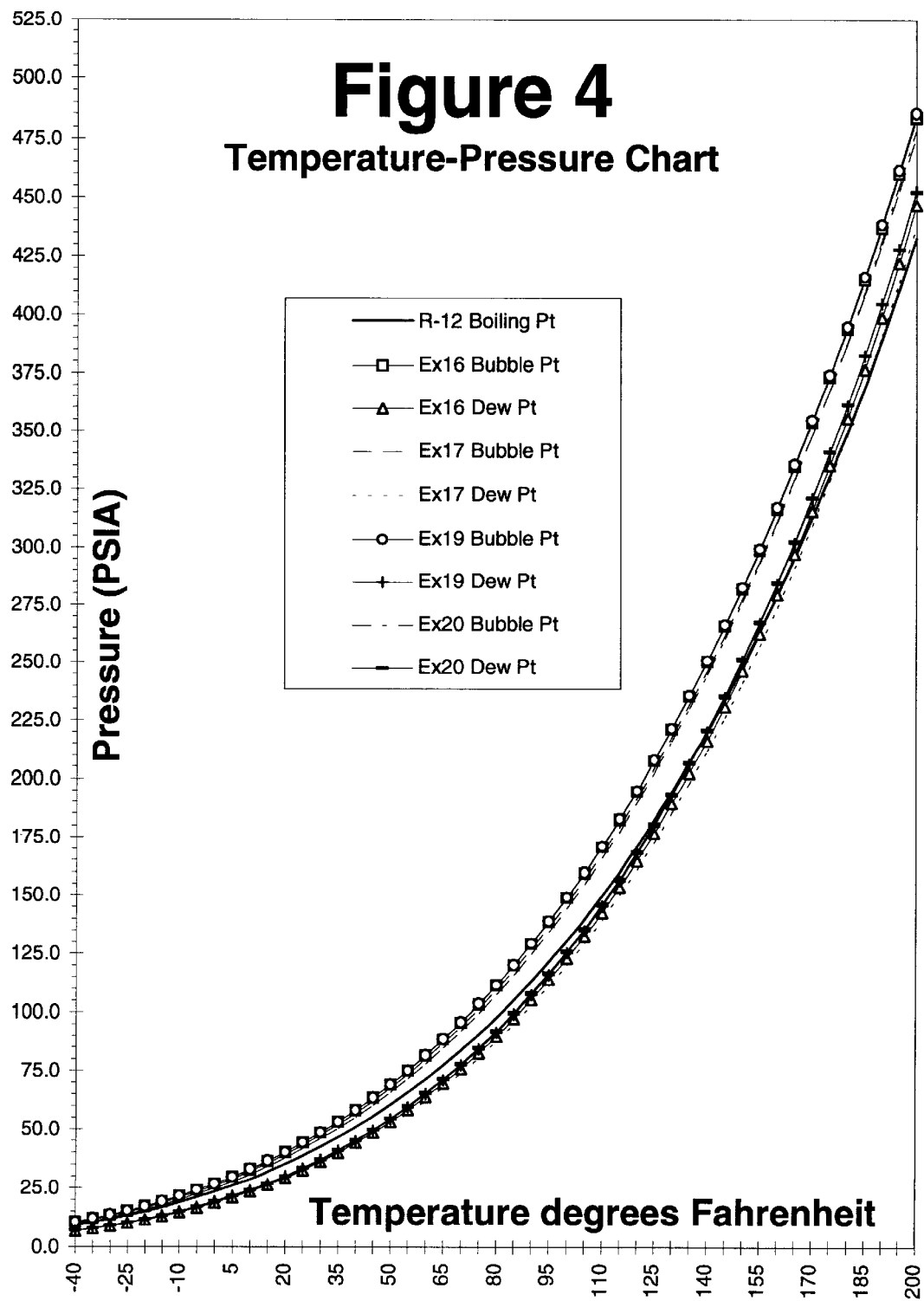

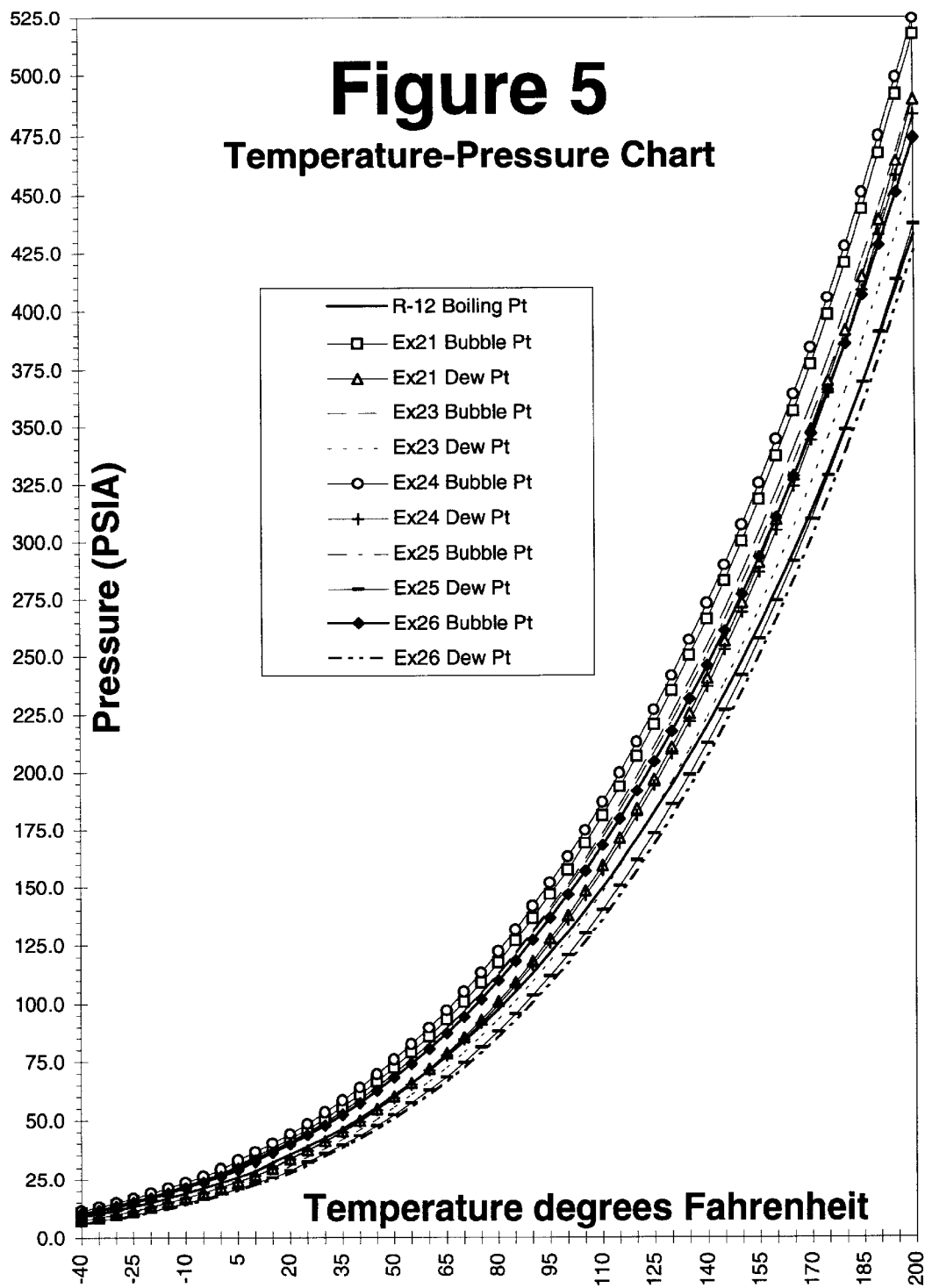

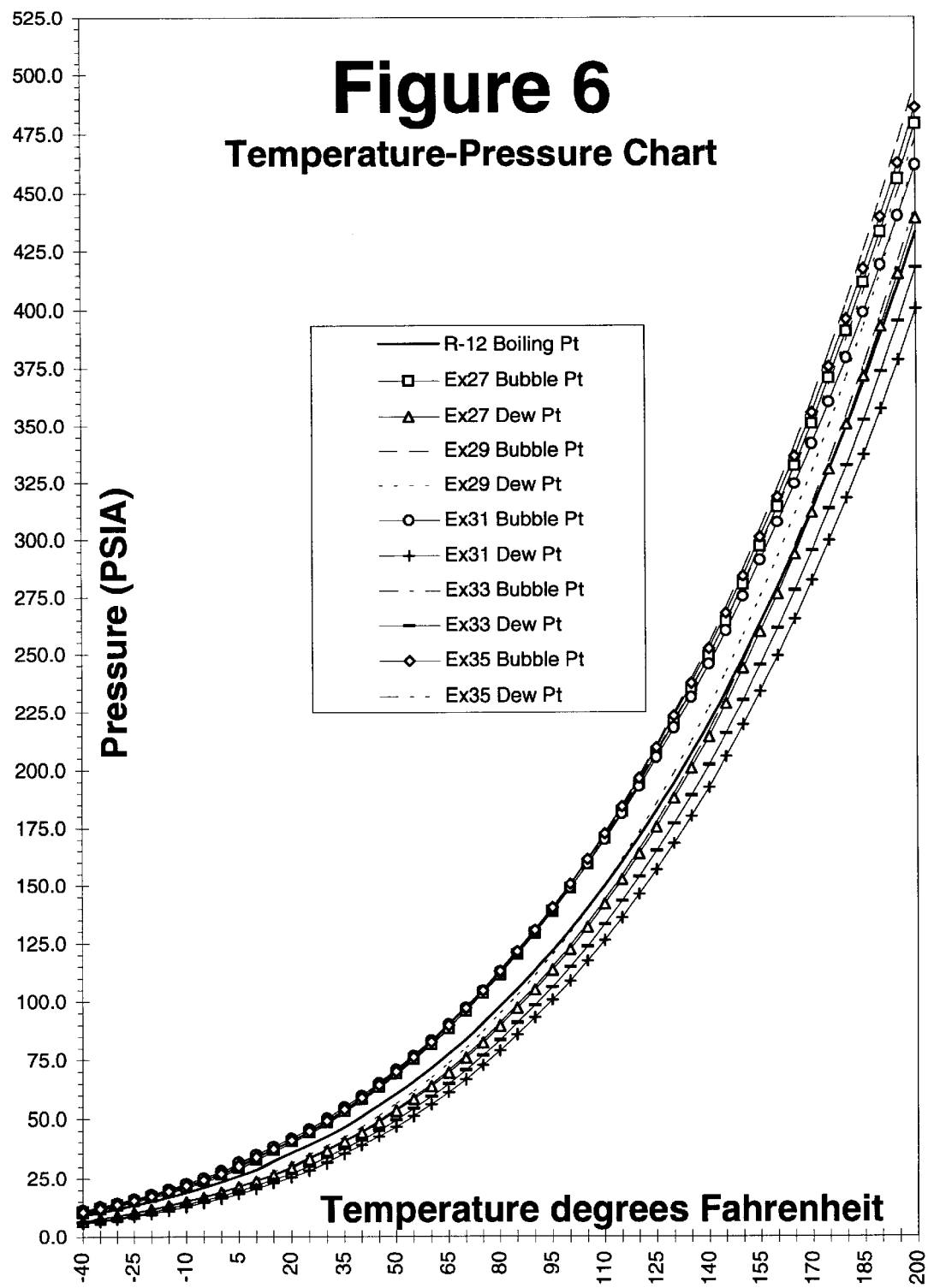

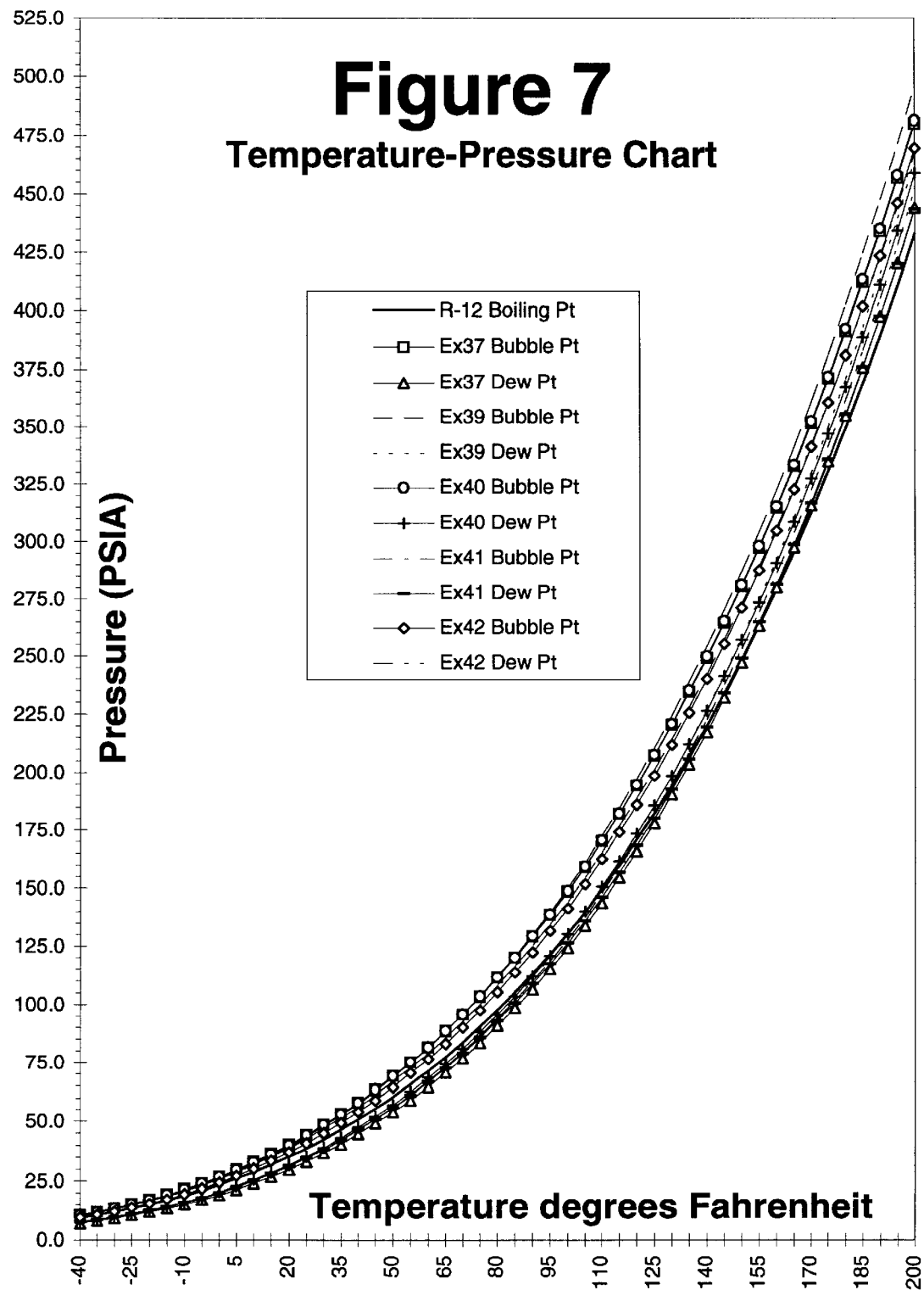

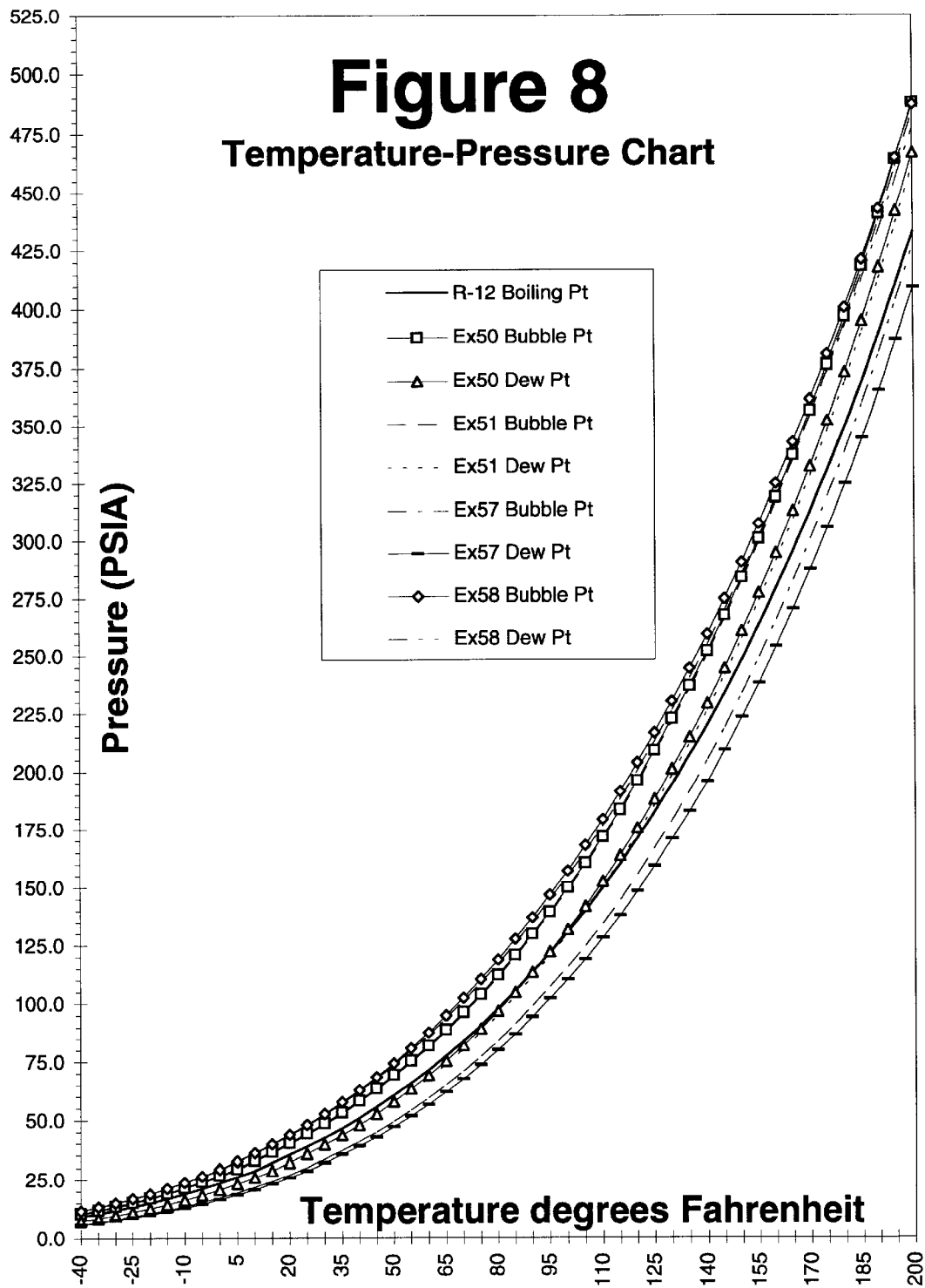

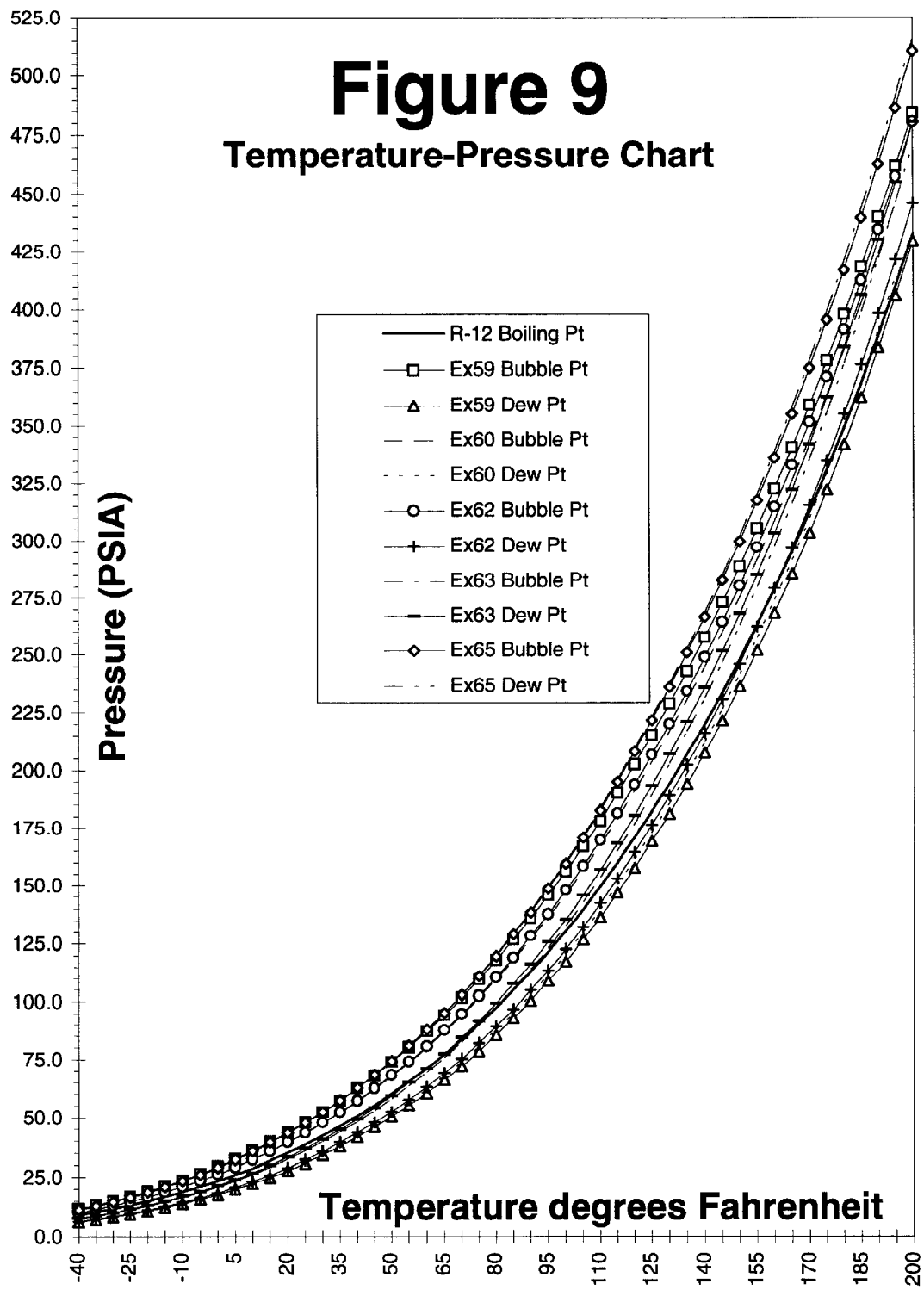

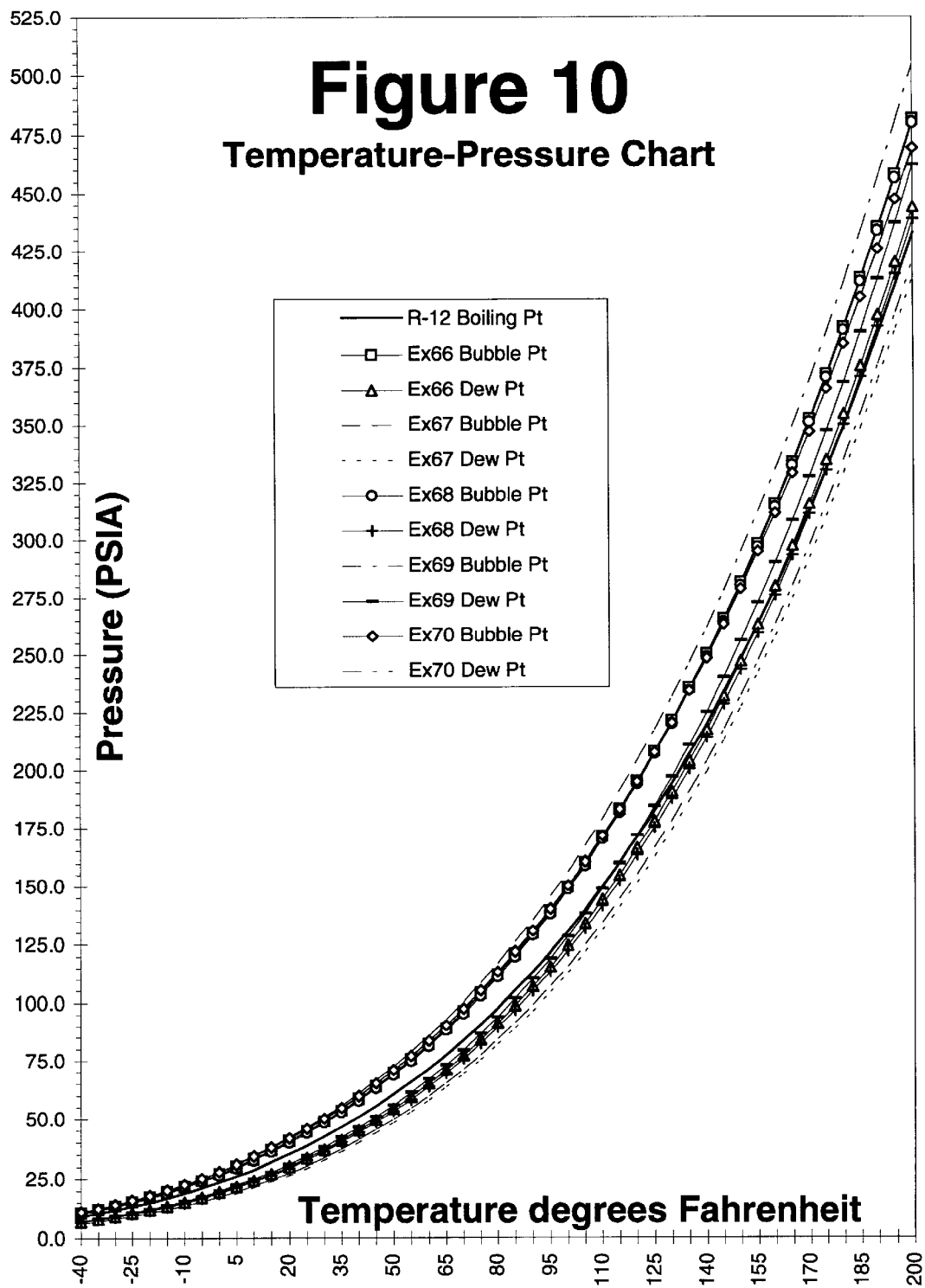

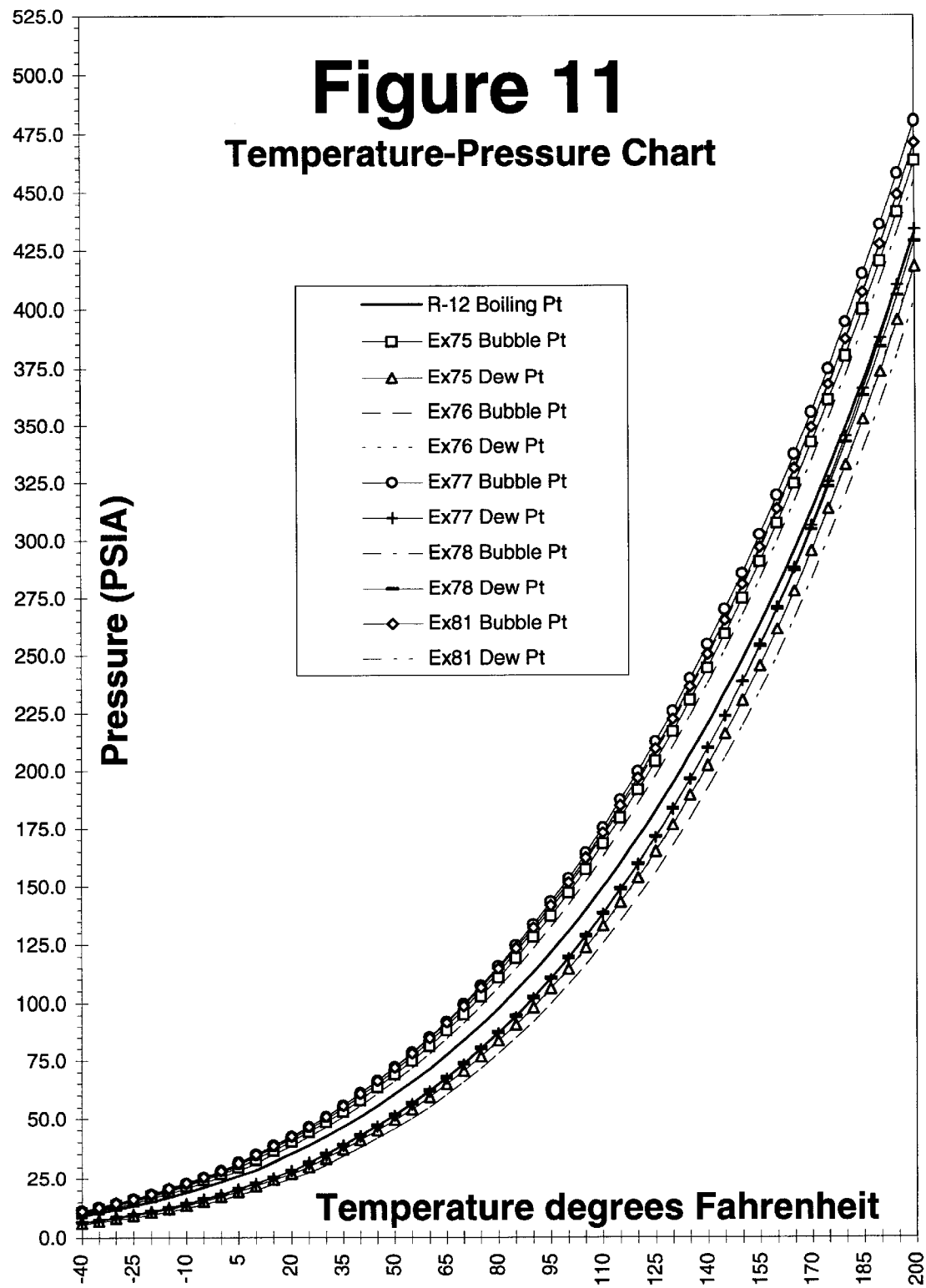

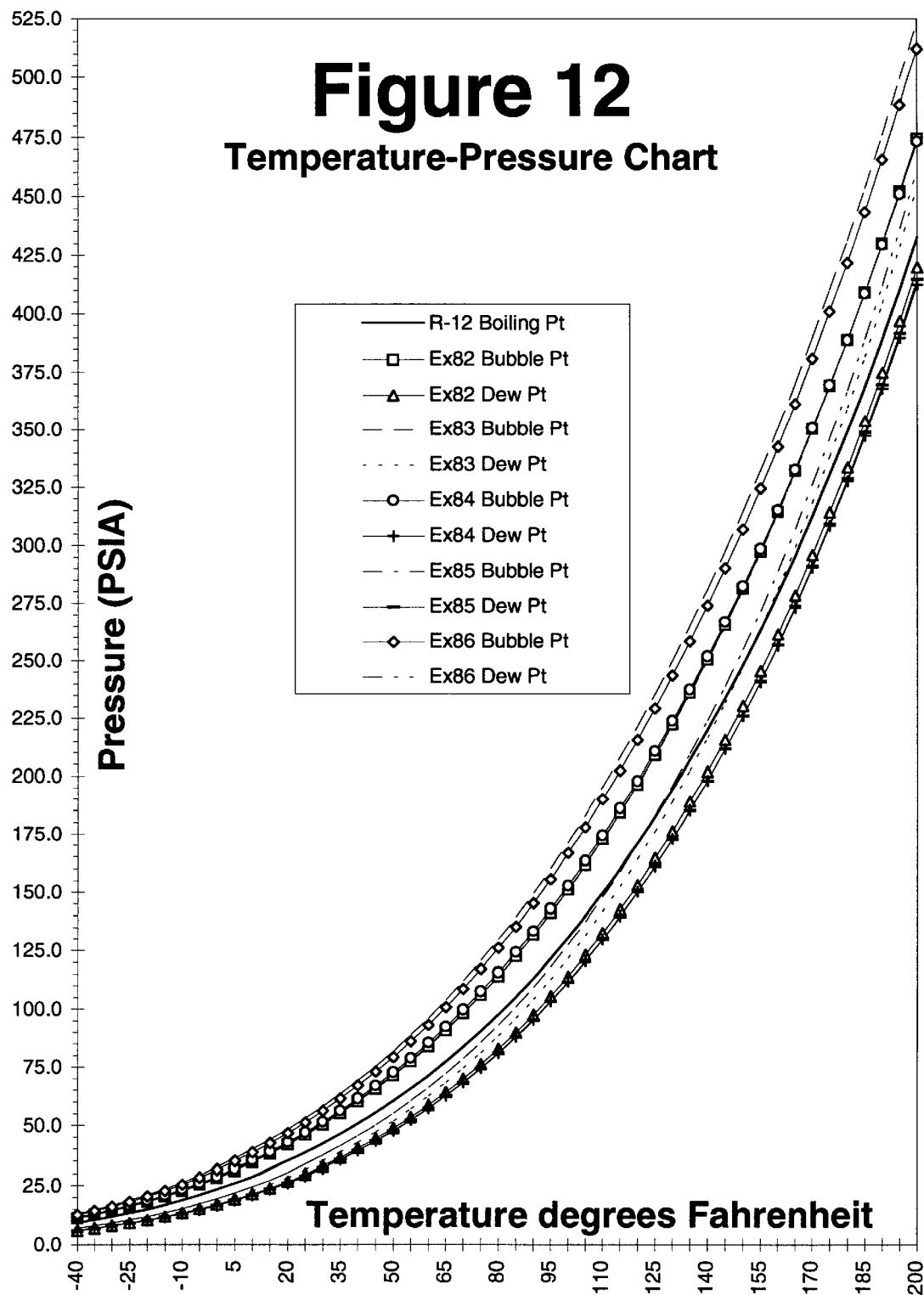

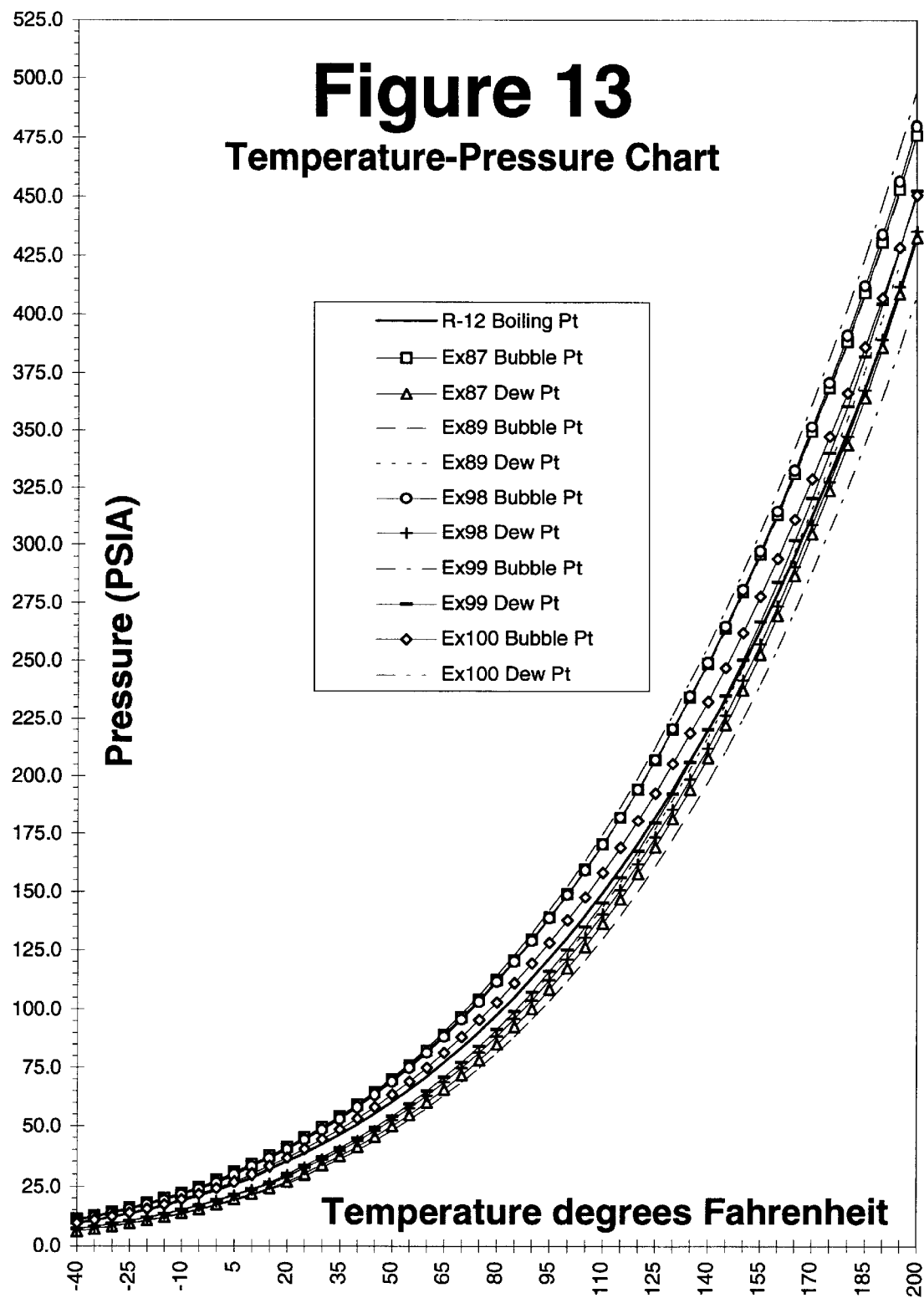

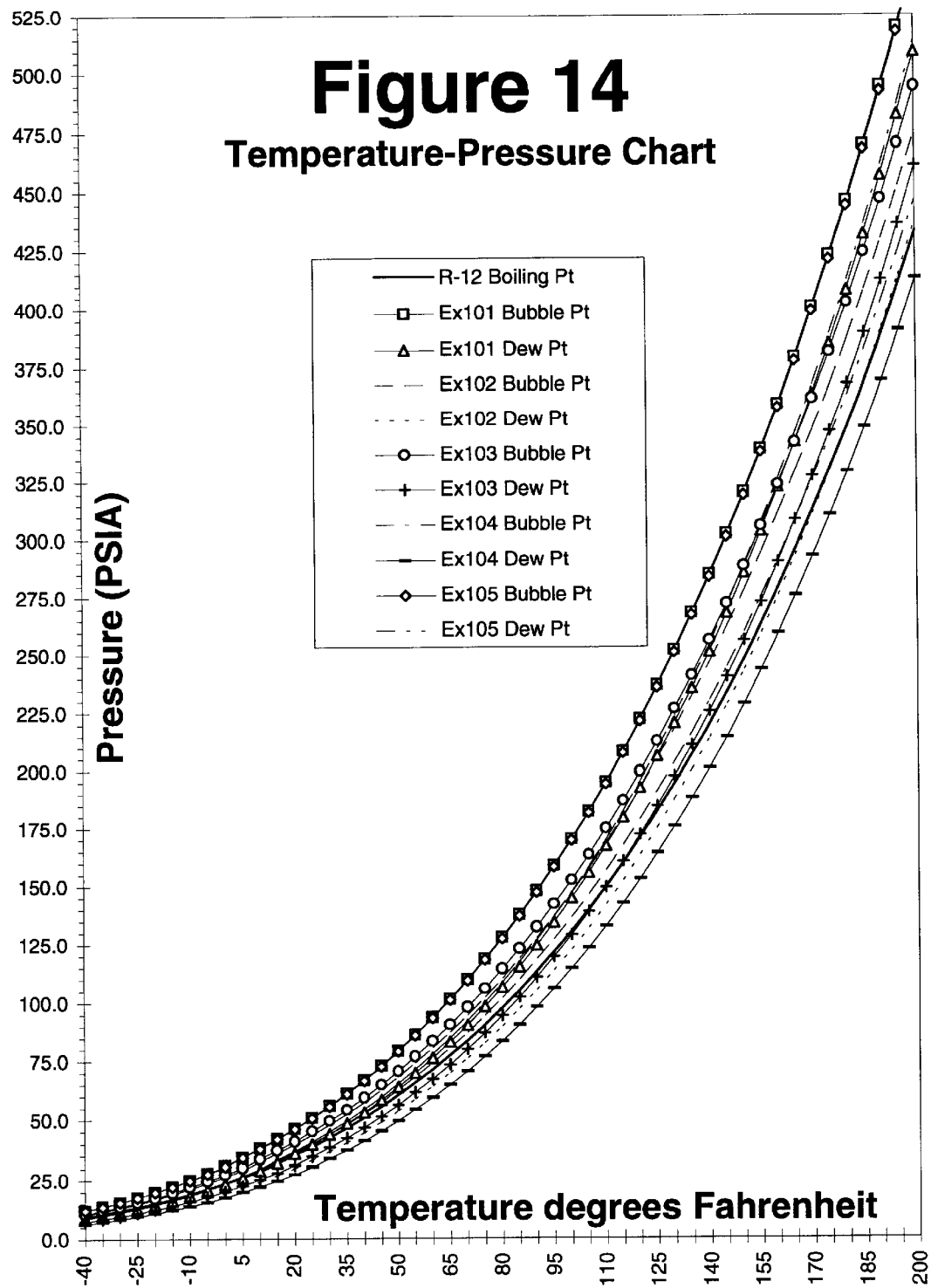

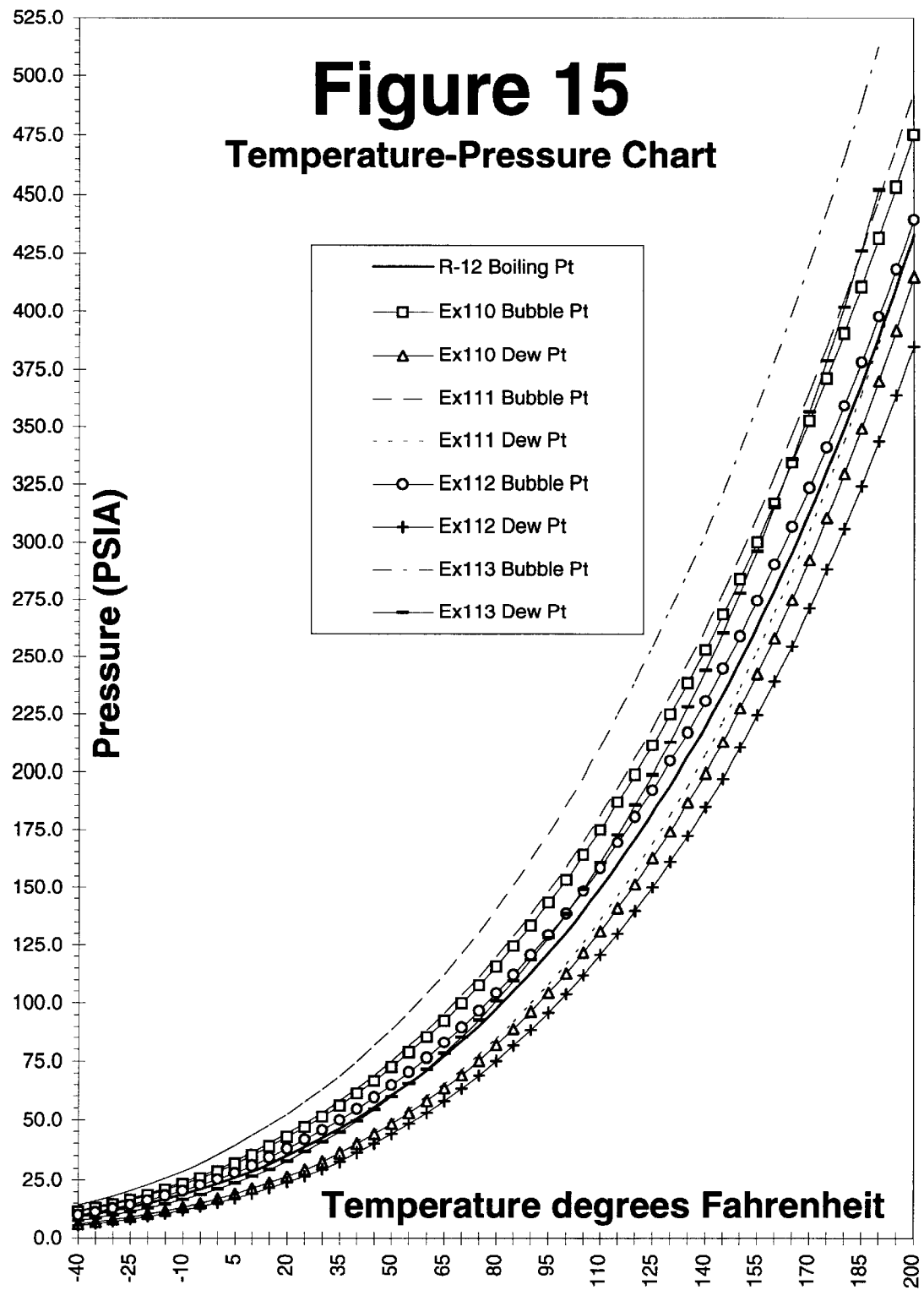

DROP-IN SUBSTITUTES FOR DICHLORODIFLUOROMETHANE REFRIGERANT

The present invention relates to refrigerants generally, and more specifically to a mixture of refrigerants that may be substituted for the environmentally damaging refrigerant dichlorodifluoromethano (R-12).

BACKGROUND OF THE INVENTION

In order to provide a more compact format for identifying mixtures of refrigerants in the following discussions, mixtures of refrigerants will be listed in the form of:

R-ABC/DEF/GHI N0/N1/N2 which represents a mixture of refrigerants (fluids) R-ASC, R-DEF, and R-GHI where N0, N1, and N2 are the weight percentages of each component refrigerant fluid, and N0+N1+N2=100; or in the form of:

R-ABC/DEF/GHI N0–N0'/N1–N1'/N2–N2' which is similar, but specifies ranges of the weight percentages each of the component refrigerant fluids, with the total of the weight percentages being 100 percent.

Zeotropic (nonazeotropic) mixtures of refrigerants will change composition if they are allowed to leak as vapor phase from a container containing all components of the refrigerant mixture in both vapor and liquid phases. Single component and azeotropic mixtures of refrigerants do not change composition appreciably from vapor leakage. Single component and azeotropic mixtures of refrigerants have only one boiling point temperature for a given pressure, provided the refrigerant exists as both liquid and vapor states in the container. Zeotropic mixtures of refrigerants will boil over a range of temperatures at a given pressure. As the temperature is raised, the point at which the first bubbles appear (constant pressure) in the liquid is known as the "bubble point," which is roughly analogous to the boiling point of a single component or an azeotropic mixture. Starting in a vapor phase and lowering the temperature (at a constant pressure) to the point where the first droplet of liquid forms defines what is known as the "dew point" of the mixture of refrigerants. The difference between the bubble point temperature and the dew point temperature is known as the temperature "glide". A pressure gauge connected to a cylinder containing a zeotropic mixture of refrigerants will read the bubble point pressure for the corresponding temperature of the refrigerant mixture.

Under the Montreal Protocol, as amended, United States laws (1990 Clean Air Act), and U.S. Environmental Protection Agency rules, the production and importing of R-12 ended on Dec. 31, 1995. Additionally, only 15% of the baseline amounts of chlorinated fluorocarbons (CFCs) was allowed to be produced or imported into the U.S. during the year 1995 adjusted on an ozone depletion factor basis. R-12 is the major share of that production.

With the effective date of the ban on U.S. R-12 production and importing having passed (Dec. 31, 1995), one industry option has been to retrofit R-12 refrigeration or air conditioning systems, both stationary and automotive, to R-134a (tetrafluoroethane). The mineral oils used in R-12 systems are completely immiscible in R-134a, however, as the industry has therefore developed new oils, which are either polyalkylene glycol (PAG) based (for automotive) or polyol ester (POE) based (stationary refrigeration and some automotive retrofit).

While PAG oils are good lubricants, and are miscible in R-134a at typical evaporator temperatures, they have two main problems. First, most PAG oils cannot tolerate even minute traces of residual chlorides that remain in the R-12 refrigeration or air conditioning systems that have been purged of R-12. These chlorides are dissolved in the small amount of mineral oils which cannot be flushed out or are in coatings on the inside of aluminum piping (aluminum chloride from previous R-12) or are dissolved in rubber hoses. The presence of chlondes greatly accelerates the breakdown of most PAG oils.

It has been reported in the literature that test systems that were flushed with R-11 (trichlorofluoromethane) and then retrofitted to PAG oil and R-134a, sustained catastrophic compressor failures within one week due to oil breakdown. R-11 has a greater affect on PAG oil breakdown than does R-12. It was common practice in the automotive air conditioning service industry, into the early 1990s, to flush R-12 systems with R-11 to remove contaminates. The traces of R-11 remaining do not interfere with R-12 operation, but could cause premature failures if R-12 systems are ever retrofitted to R-134a and PAG oils.

The second main problem with PAG oils is that PAG oils are in the order of 100 times more hydroscopic (absorb moisture) than are R-12 mineral oils. During assembly, service, or after an accident, automotive R-134a systems may be exposed to atmospheric moisture which will be absorbed into the PAG oil. Extreme care is therefore required during servicing of PAG oil systems to prevent exposure to atmospheric moisture, especially in humid climates.

The stationary refrigeration industry has overwhelmingly chosen POE-based oils for R-134a systems, for both new systems and those retrofitted from R-12. POE oils can tolerate residual chlondes much better than PAG oils, however POE oils have problems also. POE oils are on the order of 10 times more hydroscopic than are R-12 mineral oils POE oils, in general, do not have as good lubrcities as do the PAG and mineral oils. Steel is a known catalyst that facilitates the breakdown of most POE oils at the higher temperatures encountered in refrigeration systems. The industry has had to develop passivators and additive packages for POE oils to try to counter this problem. Moisture and other contaminates may cause the POE oils to break down into their constituent fatty acids and alcohols.

Many industry R-134a retrofit procedures for R-12 stationary refrigeration and air conditioning systems call for 3 to 5 changes of the compressor oil (to a POE) in order to reduce the residual mineral oil to below about 1 percent to about 5 percent by volume. Most small to medium sized (up to 10 tons in capacity) hermetic compressors in R-12 equipment do not have oil drains. Therefore, the compressor must often be removed and the oil dumped out up to 5 times for a retrofit to R-134a. This entails unbrazing the low and high side refrigeration pipes from the compressor and rebrazing them up to 5 times. The brazing temperature is about 1100 degrees Fahrenheit. Service technicians often do not go to the trouble to bleed a relatively inert gas such as dry nitrogen or CO2 through the piping during brazing operations. Brazing temperatures cause the copper piping to oxidize on the inside forming "scale" which flakes off and adds to the contamination of the system. The oil coating the inside of the piping breaks down and carbonizes, adding more contaminates. Even worse, refrigerant vapors are present in the pipes during brazing, they decompose into hydrochloric and hydrofluoric acids, which greatly add to system contamination and premature failure. Finally, the physical operation of removing the compressor 5 times, and inverting it to remove oil, can allow metal flakes and other sludge which have accumulated in the bottom of the compressor oil sump to break loose and end up on the top of the inside of the compressor shell. Upon reinstalling the compressor this sludge and metal flakes may drop onto the top of the compressor and get into motor windings (causing shorts and motor burnouts, or get into the intake valves and cause mechanical problems (seized compressor).

There have been several reports that both POE and PAG oils causing skin rashes or burns to service technicians This has necessitated additional safety procedures, such as wearing gloves, were handling these oils. Unless a hermetic compressor motor burnout has occurred, R-12 mineral oils have not caused skin rashes and burns to service technicians. A hermetic compressor motor burnout causes some of the refrigerant to decompose into hydrofluoric and hydrochloric (if the refrigerant contains chlorine atoms) acids, and may cause skin burns no matter what oil is used Some compressors built for R-12 and retrofitted to R-134a with POE oils have been reported by compressor manufacturers to fail from lubrication problems caused by the lack of the "foaming" of the POE oils in the compressor crankcase, Some compressor designs relied on the fact that mineral oils and R-12 generated foaming in the compressor crankcase in order for the oil to reach and lubricate certain parts of the compressor. New compressors designed for R-134a and POE oils use other means to make sure all the parts are property lubricated.

Compressors manufactured for R-12 and mineral oil use often were constructed with a paraffin based wax coating on the motor windings as an aid to building the motor without breaking the wire during the motor winding phase of the construction. When retrofitted to R-134a and POE oils, the paraffin would sometimes come off the windings, and not dissolve in the R-134a refrigerant and POE oils, and circulate through the system as solids and plug up the refrigerant metering device, usually a capillary tube, causing the system to fail. R-12 (or a substitute with adequate mineral oil miscibility) and mineral oil, just dissolve the pieces of paraffin wax which come off the motor windings and therefore do not clog the refrigerant metering device.

Finally, the low critical temperature of R-134a (213.9 degrees Fahrenheit) verses the critical temperature of R-12 (233.2 degrees Fahrenheit) can cause abnormally high head pressures in hot ambient conditions in systems designed for R-12. For automotive applications, stopped traffic or hot climates can cause a reduction in R-134a performance. Systems designed for R-134a often increase the size of the condenser about 50 percent over tie size similarly designed R-12 system condenser. Stationary systems, such as vending machines, now retrofitted to R-134a may see high head pressure and low performance problems when the condenser becomes slightly fouled by dirt and dust R-12 systems can run much longer between cleanings to remove dust and dirt from the condenser than similar systems converted to R-134a.

R-406A is a known ternary mixture of refrigerants, consisting of isobutane (R-600a), chlorodifluoroethane (R-142b), and chlorordifluoromethane (R-22) that provides a "drop-in" substitute for dichlorodifluoromethane (R-12) refrigerant. R-406 is described in U.S. Pat. Nos. 5,151,207 and 5,214,929, the disclosures of which are incorporated herein by reference.

In addition to being a suitable "drop-in" substitute for R-12, R-406A has been successfully used as a "drop-in" substitute for refrigerant R-500 (azeotropic mixture of R-12 and R-152a with weight percentages of 73.8 and 26.2. respectively) in many instances. R-152a is 1,1-difluoroethane.

Refrigeration systems with refrigerant metering devices consisting of a capillary tube or a fixed orifice have had excellent results with R406A as a "drop-in" substitute. Some R-500 systems with "thermostatic expansion valves" (TEVs), have needed the "power head" of the expansion valve changed to an R-12 head, while others have performed satisfactory.

Several other attempts have been made to create the ideal "drop-in" substitute for R-12. Some do not return mineral oil to the compressor property at temperatures of desired operation (i e Forane® FX-56 (R-124/142b/22 25/15/10) also known as R-409A, U.S. Pat. No 5,188,749; and FRIGC™ FR-12™ (R-600/124/134a 2/39/59), U.S. Pat. No 5,425, 890) Changing the compressor oil from mineral oil to alkylbenzene oil will often correct the oil return problems, but now an oil change is necessary and the refrigerant is no longer a "drop-in" substitute for R-12.

Some attempts have provided temperature-pressure curves which are not always suitable for operation of R-12 equipment. The Forane® FX-56 refrigerant temperature-pressure curve is too high, which results in excessive head pressures, refrigerant breakdown and compressor failures in many instances. See FIG. 1 for the Foran® FX-56 temperature-pressure chart FRIGC™ FR-12™, on the other hand, has a temperature-pressure curve which is too low, which results in low system capacities, and causes problems if system low pressure cut out controls are not replaced or adjusted. See FIG. 1 for the FRIGC™ FR-12™ temperature-pressure chart. FRIGC™ FR-12™ used in an automotive air conditioning system should produce suction side pressures of about 18 to about 23 gauge pressure (PSIG), whereas R-12 would produce about 28 to about 32 PSIG. This causes the low pressure controls to prematurely open, falsely sensing low-charge or too cold conditions. Once opened, the compressor clutch disengages, stopping the compressor, and the system equalizes in pressure, and restarts. This results in poor capacities, and excessive clutch wear from cycling every few seconds. Automotive variable displacement compressors, such as the GM V-5, try to maintain a constant suction pressure, usually about 28 to about 30 PSIG for capacity control. The lower than R-12 temperature-pressure curve of FRIGC™ FR-12™ fools these compressors into operating at a much lower displacement than for R-12 under given load conditions, thus greatly reducing capacities (in the order of 50 percent reduction or more). If a large amount of FRIGC™ FR-12™ (3 pounds or more), is allowed to vapor leak under ambient temperatures of about 10 degrees to about 25 degrees Fahrenheit. The remaining mixture may possibly first go weakly flammable then highly flammable near the very end of the leak out (90 weight percent or more of the mass has leaked). The boiling point of their highest boiling point component. R-600 (n-butane), is 31.03 degrees Fahrenheit, while their next lower boiling point component is R-124, with a boiling point of 8.26 degrees Fahrenheit.

These foregoing and additional known refrigerant mixtures are summarized below. Some are disclosed in research papers and others in U.S. Patents, while still others are commercial products on the market.

R-124/22 60/40

Has poor mineral oil miscibility. See U.S. Pat. No. 4,303, 536.

R-124/125 65/35

Almost nonexistant mineral oil miscibility, and the glide is too high

R-124/142b/22 25/15/60

This is Elf Atochem Forane® FX-56, or R-409A. See U.S. Pat. No. 5,188,749. Forane® FX-56 has poor mineral oil miscibility, and the temperature-pressure curve is too high. It is sometimes claimed to be an R-12 "drop-in", other times claimed to be near "drop-in" requiring changing oil to alkylbenzene type to assure miscibility. Six hours of operation in the oil miscibility test stand described in Appendix A, caused moderate oil logging in the evaporator and suction line at an evaporator temperature of about 10 degrees Fahrenheit using Suniso 3GS (150 viscosity) mineral oil, standard for systems of this type. Severe oil logging occurred around −20 degrees Fahrenheit, with two phase (oil and liquid refrigerant) and "milky" solutions observed in the evaporator. Pure R-22 performed much the same way. The "milky" solution is caused by an immiscible "dispersion" of oil and liquid refrigerant. After severe oil logging from Forane® FX-56 at about −20 degrees Fahrenheit, the Forane® FX-56 was removed, and the oil miscibility test stand was charged with the refrigerant mixture later described in Example 1. Two hours of operation with Example 1 returned almost all the oil to the compressor, operating at about −30 degrees Fahrenheit.

R-22/124/142b 65/25/10

This is Elf Atochem Forane® FX-57, or R409B. This mixture will have even less miscibility in mineral oil than Forane® FX-56. Forane® FX-57 will also have an even higher temperature-pressure curve than Forane® FX-56 due to more R-22 component and less R-142b component.

R-124/152a/22 24/13/53

This is DuPont SUVA® MP-39, or R-401A. See U.S. Pat. No. 4,810,403. R-401A has poor miscibility in mineral oils. DuPont recommends at least 80 volume percent of the compressor oil be changed to alkylbenzene type to assure miscibility R-401 A works fine provided compressor oil is changed.

R-124/152a/22 61/11/28

This is DuPont SUVA® MP-66, or R-401 B. The same comments for R-401A apply here as well.

R-124/152a/22 33/15/32

This is DuPont SUVA® MP-52, or R-401C. The same comments for R-401A apply here as well R-600/124/134a 2/39/59

This is Intermagnetics General Corporation (IGC) FRIGC™ FR-12™. See U.S. Pat. No. 5,425,890 FRIGC™ FR-12™ claims to be a "drop-in" for R-12, but the temperature-pressure curve is about 8 degrees Fahrenheit too low at evaporator temperatures (32 degrees Fahrenheit) in automotive air conditioning systems, causing low capacity, excessive compressor cycling and rapidly wearing out compressor clutches. Excessive clutch cycling may be eliminated by replacing low pressure cutout switches. FRIGC™ FR-12™ has poor mineral oil miscibility. FRIGC™ FR-12™ may become weakly or highly flammable due to vapor leakage under cold (about 10 to about 25 degrees Fahrenheit) ambient conditions. However, the amount of flammable mass remaining would be small, in the order of 10 weight percent of the original system charge.

R-22/152a/142b/C318 45/7/5.5/42.5

This is China Sun G2015, or R-405A. R-405A has very marginal mineral oil miscibility, all components are totally immiscible with mineral oil except for R-142b and R-22, which are poor. The R-C318 component is expensive and the R405A mixture was banned (listed as SNAP unacceptable) by the US EPA due to global warming concerns of the R-C318 component, which does not easily break down in the atmosphere, even after several thousand years.

R-22/218/142b 70/5/25

This is R-412A. Although intended as a "drop-in" substitute for R-500, it still has a temperature-pressure curve which is too high for most uses and limited mineral oil miscibility, but slightly better miscibility than Forane® FX-56 and Forane® FX-57 due to more R-142b component. R-218 component is a perfluorinated fluorocarbon with a high global warming potential and a very long atmospheric lifetime, and like R-C318, the US EPA is not approving these compounds for refrigerants.

R-290/600a 60/40

Excellent refrigerant, with excellent oil miscibility. Low cost of components. The problem is the extreme flammability of all components (all hydrocarbons). Blends similar to this have been around a number of years. OZ-12, HC-12a, and ES-12r are tradenames of some similar hydrocarbon blends. At least 14 states have banned the use of hydrocarbon blends for motor vehicle air conditioning along with a Federal ban by the US EPA, which took effect on Jul. 14, 1995.

R-22B1 100

This is Bromodifluoromethane, or Great Lakes Chemical FM-100. The temperature-pressure curve is too low. R-22B1 boils at 4.2 degrees Fahrenheit (R-12 boils at −21.6 degrees Fahrenheit). R-22B1 conta a bromine atom, causing a significant ozone depletion potential, therefore the EPA will not approve its use for refrigerant. R-22B1 has excellent mineral oil miscibility.

R-134a 100

R-134a has complete immiscibility in mineral oil, making it not suitable for most R-12 applications. However, some systems, such as some household refrigerators, may successfully operate using R-134a in mineral oil if the pipe sizes are small enough to generate high enough gas velocities to drag the mineral oil around the refrigeration circuit The compressor is usually located downhill from the evaporator, further minimizing oil return problems with an immiscible oil/refrigerant mixture.

R-152a/22B1 77/23

Good miscibility with mineral oil, but the temperature-pressure curve is too low. Both components have boiling points well above teat of R-12. This mixture may be flammable if vapor leaked at temperatures below about 0 degrees Fahrenheit R-22B1 is not approved by the US EPA for refrigerant use due to high ozone depletion potential.

R-227ea 100

No miscibility with mineral oil and the temperature-pressure curve is much too low.

R-152a/227ea 80/20

No miscibility with mineral oil and the temperature-pressure curve is lower than R-12, causing around a 10 percent reduction in capacity in unmodified systems. This mixture will be flammable, especially when leaking at colder temperatures, below about 0 degrees Fahrenheit.

R-152a/227ea 50/50

No miscibility with mineral oil and the temperature-pressure curve is lower than R-12, causing around a 12 percent to 15 percent reduction in capacity in unmodified systems. This mixture may be flammable, especially when leaking at colder temperatures, below about 0 degrees Fahrenheit.

R-290/227ea 50/50

Good miscibility with mineral oil. Pressure-temperature curve is much too high, almost as high R-22. This mixture will be highly flammable.

R-152a 100
Flammable, but not as bad as propane (R-290). No miscibility with mineral oil. Temperature-pressure curve is too low, causing around a 10 percent reduction in capacity.
R-290/227ea 10/90
Good temperature-pressure curve, and good mineral oil miscibility This blend will be flammable when vapor leaked at temperatures below about 0 degrees Fahrenheit and may be weakly flammable when leaked at higher temperatures. This mixture has a large mass fraction in the higher boiling component (R-227ea), which on some systems may cause unwanted liquid refrigerant return (slugging) to the compressor since there will be a large fraction of the boiling liquid near the exit end of the evaporator. This narrows the margins for charging and suction superheat setup on refrigeration systems.
R-227ea/E170 70/30
R-E170 is dimethyl ether This mixture has good mineral oil miscibility, but the temperature-pressure curve is too low. This mixture may be flammable, especially when vapor leaking at colder temperatures, such as below about 0 degrees Fahrenheit.
R-227ea/600a 75/25
Good mineral oil miscibility, but the temperature-pressure curve is way too low. This mixture might exhibit a region of flammability when vapor leaked in a temperature range of about 0 degrees Fahrenheit, and about 100 degrees Fahrenheit.
R-152a/227ea 20/80
No mineral oil miscibility, and the temperature-pressure curve is too low. This mixture is probably non flammable or possibly weakly flammable over limited regions.
R-152a/131 25/75
R-1311 is trifluoroiodomethane (CF3I). Pressure-temperature curve is too low. This mixture has a boiling point of about −8.5 degrees Fahrenheit. There are also concerns of the stability of R-1311 due to the weakness of the iodine bond. The inventors of this mixture claimed that light broke down R-1311 and caused refrigerant sight glasses to show purple in about two weeks. The inventors also claimed an extremely high ozone depletion potential for R-1311, but an almost zero ozone depletion potential after release into the atmosphere after a small number of days (less than a week) due to the breakdown of the CF3I molecule. Toxicity of CF3I is not well established yet.
R-152a/227ea 25/75
No miscibility in mineral oil. The boiling point of −5.2 degrees Fahrenheit indicates a temperature-pressure curve which is too low This mixture may also exhibit regions of flammability when vapor leaked at colder temperatures, below about 10 degrees Fahrenheit.
R-218/134a/600a 9/88/3
This is Isceon 49. Based on a published bubble point of 99 PSIA, the temperature-pressure curve may be a little high, but useable. R-218, a PFC, is now banned by the US EPA for use in refrigerants due to high global warming potential and extremely long atmospheric lifetimes in the thousands of years. Mineral oil miscibility is very poor.
R-22/142b 40/60
Temperature-pressure curve is too low (R-22/142b 55/45 is much closer). Vapor leaking may cause mixture to become weakly flammable, but with no flashpoint. Mineral oil miscibility is poor, but may be useable in high temperature equipment (35 degrees Fahrenheit and higher) for the evaporator temperatures. Mineral oil miscibility is similar to (slightly better than) R-22.
R-134a/600a 80/20
Proposed by Electrolux. Good mineral oil miscibility, but the temperature-pressure curve appears to be slightly high from computer simulations (REFPROP V4.0) and almost azeotropic behavior is exhibited. This mixture appears to have a simulated boiling point about −28 degrees Fahrenheit. It may be a useable substitute for R-500 though. Some azeotropes exhibit a boiling point outside the range (usually lower) of the boiling points of the individual components. The simulated azeotropy point is R-134a/600a 77.83/22.17 for this mixture. An azeotropic mixture behaves, for practical purposes over the temperatures of interest, as a single component refrigerant fluid. During the boiling of the liquid phase of the mixture, all components evaporate at equal rates and fractionation does not occur. The glide is essentially zero. The simulated critical temperature is 211.0 degrees Fahrenheit, which is lower than that of R-134a, which will cause high head pressures in hot environments. This mixture will be flammable.
R-134a/152a 85/15
Boiling points of both components are lower than R-12. Temperature-pressure curve will he slightly too low at evaporator temperatures, but it closely matches that of R-134a (by computer simulation). Azeotropic behavior is observed from simulation, with boiling point of −15.62 degrees Fahrenheit which is practically the same as R-134a. No miscibility with mineral oil. This mixture should be nonflammable or weakly flammable at worst at temperatures of interest, but may be flammable under new strict US flammability standards such as Underwriters Laboratones (UL) 2182 where testing is currently performed at 100 degrees Centigrade.
R-134a/600a 95/5
Mediocre miscibility in mineral oils. The temperature-pressure curve is good (near azeotrope). This mixture should work fine in systems where the compressor does very little "oil pumping" (circulating oil in the refrigerant circuit), such as some household refrigerators. Other systems, especially automotive air conditioner compressors and commercial systems can circulate as much as 10 or 15 percent by volume of oil with the refrigerant. This mixture will not be able to return all the oil under those conditions R-134a has zero oil miscibility by itself, and the addition of a small percentage of a hydrocarbon such as R-600a will not cause the R-134a itself to carry any oil and all the oil will have to be carried by the hydrocarbon. Flammability constraints limit the amount of the hydrocarbon component to around 5 percent.

Five pounds of the R-134a/600a 95/5 mixture were made up for test purposes. About two pounds were charged into the oil miscibility test stand described in Appendix A. Running the evaporator at about −40 degrees Fahrenheit for about 3 hours, caused severe oil return problems, with oil logging observed, and the crankcase oil level dropping. The evaporator temperature was raised to about 5 degrees Fahrenheit by partially closing the manual evaporator pressure regulator valve, and oil continued to become trapped in the evaporator with further observed drooping of the crankcase oil level to near the bottom of the sight glass (compressor running, oil level at top of sight glass at start of run) No oil return was observed at either temperature in the overhead suction line sight glass.

The evaporator temperature was then raised to about 30 degrees Fahrenheit, by the application of about 2500 watts of electrical power to the evaporator. A limited amount of oil was now observed returning to the compressor, as small (amount 1 mm in size) entrained "balls" in the suction gas flow. It was not creeping along the walls of the suction pipes as is usually the case with a mineral oil miscible refrigerant. It can therefore be concluded, that the addition of about 5 percent weight of isobutane to R-134a, provides only very limited mineral oil return capability, for high temperature systems, and is essentially useless for returning oil at lower temperatures of operation. The oil used was Suniso 3GS (150 viscosity).

Since automotive compressor oil has a much higher viscosity than do most oils used for stationary refrigeration (automotive is usually 525 viscosity), the increase in oil return, due to the addition of the isobutane for automotive air conditioning, is expected to be almost nil.

The R-134a/600a 95/5 mixture should be nonflammable at normal temperatures of operation, but may be flammable under new strict US flammability standards such as Underwriters Labs (UL) 2182 where testing is currently performed at 100 degrees Centigrade.

R-218/152a 83.5/16.5

Claims to replace R-12, R-502, and R-22. This composition calculates (with REFPROP V4.0) computer simulation to have a temperature-pressure curve much too high for R-12 replacement. It is closer to R-22. Even if the R-218 weight percentage were drastically reduced and the R-152a increased to achieve a good temperature-pressure curve for R-12, this mixture would still have no mineral oil miscibility. The R-218 is currently banned for refrigerants by the US EPA due to high global warming potential and long atmospheric lifetime.

R-22/142b/600a 55/41/4

This is R-406A, and it has performed satisfactory in the field as a "drop-in" substitute for R-12, and it is nonflammable (after fractionating from vapor leaking) when used by those skilled in the art of refrigeration at normal temperatures of operation of R-12 refrigeration and air conditioning systems Safety testing by several independent labs has verified this. However, new very strict flammability regulations are coming into place in the Unites States, while other countries (many in Europe) are changing over to highly flammable hydrocarbon mixtures of refrigerants. Many refrigerant fluids will be essentially nonflammable at normal temperatures of operation, but may fail a flammability test that specifies an artificially high temperature of operation such as 212 degrees Fahrenheit or higher. R-406A falls into this category.

It is clear from the foregoing discussion that a "drop-in" substitute for R-12, which does not require oil changes and has a higher critical temperature than R-134a, would result in many benefits.

The automotive air conditioning market for a R-12 substitute in the U.S. is huge with an estimated 125 million cars presently left using R-12. It is imperative that "drop-in" R-12 substitutes continue to be developed and used to prevent the costly and premature replacement of billions of dollars worth of refrigeration and air conditioning equipment

BRIEF DESCRIPTION OF THE DRAWINGS

FIGS. 1–15 compare the R-12 boiling point to the bubble point and dew point of commercial refrigerants and examples 1–113.

SUMMARY OF THE INVENTION

In summary, I have discovered a group of refrigerant fluids, which are listed in Tables 1-3, which may be combined in novel ways to produce several excellent "drop-in" substitutes for refrigerants R-12 or R-500. The performance of the preferred "drop-in" substitutes for R-12 or R-500 of the present invention often exceeds that of the refrigerant being replaced, while maintaining acceptable oil circulation with existing mineral oils used in R-12 or R-500 refrigeration and air conditioning systems. For the purposes of this invention, "refrigeration and air conditioning systems" will be referred to collectively as "refrigeration systems." Also, for the purposes of this invention, "R-500 refrigeration systems" will be considered to be included within the phrase "dichlorodifluoromethane refrigeration systems."

One embodiment of the present invention is an improvement to the novel ternary mixture of refrigerants described in U.S. Pat. No. 5,151,207, which is a "drop-in" substitute for R-12, but unlike R-12, provides very little stratospheric ozone damage. One embodiment of the invention described in U.S. Pat. No. 5,151,207 comprises a ternary mixture of refrigerants that is a "drop-in" substitute for dichlorodifluoromethane (R-12), comprising about 2 to 20 weight percent isobutane (R-600a), about 21 to 51 weight percent chlorodifluoroethane (R-142b), and about 41 to 71 weight percent chlorodifluoromethane (R-22), with the weight percentages of the components being weight percentages of the overall mixture One embodiment of the present invention improves on the invention of U.S. Pat. No. 5,151,207, by adding to the preferred embodiments disclosed therein one or more components from Tables 1 or 2.

Among the most preferred embodiments of the present invention are mixtures of refrigerants which are "drop-in" substitutes for dichlorodifluoromethane (R-12), comprising about 0.5 to 8 weight percent isobutane (R-600a), about 15 to 60 weight percent of component B, and about 21 to 71 weight percent chlorodifluoromethane (R-22), with the weight percentages of the components being weight percentages of the overall mixture. Component B is about 1 to 99 weight percent chlorodifluoroethane (R-142b) and about 1 to 99 weight percent component C, with the weight percentages of the subcomponents of component B being weight percentages of component B Component C is about 0 to 100 weight percent heptafluoropropane (R-227ea) and about 0 to 100 weight percent chlorotetrafluoroethane (R-124), with the weight percentages of the subcomponents of component C being the weight percentages of component C.

Another embodiment of the present invention is the creation of additional "drop-in" substitutes for R-12 from novel mixtures of components from Tables 1-3.

Another embodiment of the present invention is the creation of a "drop-in" or near "drop-in" substitute for R-500 from novel mixtures of components from Tables 1-3.

It is also an object of the present invention to provide a "drop-in" refrigerant substitute for R-12 that provides an acceptable level of cooling in low, medium, and high temperature applications where R-12 is now in use, and that mixes well enough with compressor oils that are miscible with R-12 to provide adequate lubrication of existing compressors that utilize R-12. The mixing with existing R-12 oils must be sufficient to allow said oils to property circulate through the refrigeration circuit and not become excessively trapped (or "logged" in the refrigeration trade) in the evaporator, condenser or other parts of the system. Excessively trapped oils in the refrigeration circuit can interfere with proper operation and efficiency of refrigeration systems, or in severe cases, cause compressor failure from lack of oil.

It is also an object of the present invention to provide additional flammability suppression in R-12 systems at elevated temperatures.

It is also an object of the present invention to provide a "drop-in" substitute refrigerant for R-12 that causes very little stratospheric ozone damage.

It is also an object of the present invention to provide a "drop-in" substitute refrigerant for R-12 that causes very little global warming damage.

It is also an object of the present invention to provide a "drop-in" or near "drop-in" refrigerant substitute for R-500 that provides an acceptable level of cooling in low, medium, and high temperature applications where R-500 is now in use, and that mixes well with compressor oils that are miscible with R-500 to provide adequate lubrication of existing compressors that utilize R-500. The mixing with existing R-500 oils must be sufficient to allow said oils to property circulate through the refrigeration circuit and not be excessively trapped (or "logged" in the refrigeration trade) in the evaporator, condenser or other parts of the system. Excessively trapped oils in the refrigeration circuit can interfere with proper operation and efficiency of refrigeration systems, or in severe cases, cause compressor failure from lack of oil.

DESCRIPTION OF THE PREFERRED EMBODIMENTS

For the purposes of promoting an understanding of the principles of the invention, reference will now be made to the embodiments described below and specific language will be used to describe the same. It will neverless be understood that no limitation of the scope of the invention is thereby intended, such alterations and further modifications in the described embodiments, and such further applications of the principles of the invention as described therein being contemplated as would normally occur to one skilled in the art to which this invention relates.

Since the Jan. 7, 1991, filing date of the application which became U.S. Pat. No. 5,151,207, several new refrigerant fluids which are listed in Table 1, below, have become available in commercial quantities. Refrigerant fluids that were referenced in U.S. Pat. No. 5,151,207 are included in Table 2 for completeness. Additional known refrigerant fluids that are useful as mixture components in the present invention are also included in Table 3. Boiling points (BP), and critical temperatures (Crit) in Tables 1–3 are in degrees Fahrenheit and are taken from the November 1993 "NIST Database 23: NIST REFPROP V4.0", available from U.S. Department of Commerce, Technology Administration, National Institute of Standards and Technology (NIST), Standard Reference Data Program, Gaithersburg Md. 20899, and the "June 1995 ARTI Refrigerant Database", available from Engineering Consultant 10887 Woodleaf Lane, Great Falls Va. 22066-3003. Molecular weights (MW) are taken from the same sources.

TABLE 1

| R-num | Formula | Name | BP | Crit | MW |
|---|---|---|---|---|---|
| R-227ea | CF3CHFCF3 | 1,1,1,2,3,3,3-heptafluoropropane* | 2.5 | 215.37 | 170.0 |
| R-124 | CHClFCF3 | 2-chloro-1,1,1,2-ttrafluoroethane | 8.26 | 252.45 | 136.4 |
| R-134a | CF3—CH2F | 1,1,1,2-tetrafluoroethane | −15.07 | 214.07 | 102.0 |
| R-143a | CF3—CH3 | 1,1,1-trifluoroethane | −53.23 | 163.58 | 84.04 |
| R-125 | C2HF5 | pentafluoroethane | −55.43 | 151.12 | 120.0 |
| R-E125 | CFH2—O—CF3 | difluoromethyltrifluoromethyl ether | −41.9 | 176.7 | 136.0 |
| R-E143a | CH3—O—CF3 | methyl trifluoromethyl ether | −10.8 | 220.8 | 220.8 |
| R-E227ca2 | CHF2—CF2—O—CF3 | 1-(trifluoromethoxy)-1,1,2,2-tetrafluoroethane | 26.3 | 186.0 | 238.3 |
| R-245cb | CH3—CF2—CF3 | 1,1,1,2,2-pentafluoropropane | 0.3 | 224.5 | 134.0 |

*At the present time, only the 1,1,1,2,3,3,3-heptfluoropropane isomer is available in commercial quantities, however, all isomers of heptafluoropropane are within the scope of the present invention.

TABLE 2

| R-number | Formula | Name | BP | Crit | MW |
|---|---|---|---|---|---|
| R-600a | C(CH3)3 | isobutane | 10.83 | 274.46 | 58.12 |
| R-142b | CF2Cl—CH3 | 1-chloro-1,1-difluoroethane | 15.55 | 278.87 | 100.4 |
| R-22 | CHF2Cl | chlorodifluoromethane | −41.55 | 207.07 | 86.47 |

TABLE 3

| R-num | Formula | Name | BP | Crit | MW |
|---|---|---|---|---|---|
| R-290 | C3H8 | propane | −43.75 | 206.06 | 44.10 |
| R-E170 | CH3—O—CH3 | dimethyl ether (DME) | −12.7 | 263.8 | 46.07 |
| R-1270 | CH3CH=CH2 | propylene | −53.8 | 198.4 | 42.07 |
| R-1216 | CF2=CFCF3 | hexafluoropropene | −20.2 | unknown | 150.0 |
| R-218 | C3F8 | perfluoropropane | −34.15 | 161.4 | 188.0 |
| R-C318 | C4F8 | octafluorocyclobutane | 19.42 | 239.6 | 200.4 |
| R-C270 | C3H6 | cyclopropane | −27.2 | 256.3 | 42.1 |

The refrigerant fluids in Tables 1, 2 and 3, may be grouped into four categories, GROUP-A, GROUP-B, GROUP-C, and GROUP-D as set forth in Table 4. GROUP-A contains refrigerant fluids with the higher boiling points, GROUP-B contains refrigerant fluids which improve oil miscibility with R-12 mineral oils. GROUP-C contains refrigerant fluids with the lowest boiling points. GROUP-D refrigerant fluids may be used to dilute the other three groups. Some refrigerant fluids (e.g. R-142b) may be in more than one GROUP. Flammability is listed as "very" for very flammable refrigerant fluids, "weak" for weakly or mildly flammable refrigerant fluids and "none" for nonflammable refrigerant fluids. Miscibility of the refrigerant fluid with mineral oils used in R-12 refrigeration systems at a temperature range of about −20 degrees Fahrenheit to about 0 degrees Fahrenheit is listed as "none" for no oil miscibility, as "poor" for very limited oil miscibility, as "medi" for mediocre oil miscibility, and as "good" for complete oil miscibility. Oil miscibility with a given refrigerant fluid will improve with increasing temperature if miscibility is listed as "poor" or "medi". The term "unkn" means "unknown".

ing the mass fraction of components from GROUP-A will cause the pressure versus temperature curve of the mixture of refrigerant fluids to increase and vice versa. Rarely, two or more refrigerant fluids may be combined and the resultant boiling bubble point of the mixture may not be in between the boiling points of the components. This is the result of a partial or complete azeotrope formation. If an azeotrope is formed, the resultant boiling/bubble point is often near or a few degrees lower than the component with the lowest boiling point If an unwanted azeotrope forms, additional components can be added to further modify the temperature-pressure curve.

If the object is to produce a "high performance or higher capacity mixture of refrigerant fluids, which may only be usable under certain conditions, such as automotive air conditioning, where extra horsepower is available for compressor operation, or in low temperature situations where the compressor is under loaded, then the mass fraction of the components from GROUP-C may be further increased about 5 to about 20 weight percent. Conversely, to produce a

TABLE 4

| GROUP-A | | | GROUP-B | | | GROUP-C | | | GROUP-D | | |
|---|---|---|---|---|---|---|---|---|---|---|---|
| Refrig | Flam | Oil | Refrig | Fla | Oil | Refrig | Flam | Oil | Refrig | Flam | Oil |
| R-227ea | none | none | R-142b | weak | medi | R-22 | none | poor | R-134a | none | non |
| R-124 | none | poor | R-600a | very | good | R-125 | none | none | R-1216 | none | non |
| R-142b | weak | medi | R-290 | very | good | R-143a | weak | none | | | |
| R-E143a | unkn | good | R-E143a | unkn | good | R-E125 | none | unkn | | | |
| R-E227ca2 | none | unkn | R-E170 | very | good | R-218 | none | none | | | |
| R-245cb | unkn | unkn | R-1270 | very | good | | | | | | |
| R-C318 | none | none | R-C270 | very | good | | | | | | |

Preferred embodiments of the present invention include a mixture of refrigerant fluids with one or more components from GROUP-A, zero or more components from GROUP-B, one or more components from GROUP-C, and zero or more components from GROUP-D, subject to the three following conditions.

Condition 1

The resulting temperature versus pressure curve of a closed container containing said mixture of refrigerant fluids, such that all component refrigerant fluids coexist in both liquid and vapor states in the container, should approximate the temperature-pressure curve of a closed container of R-12 for the range of temperatures and pressures commonly used for R-12 refrigerant, about −40 degrees Fahrenheit to about 200 degrees Fahrenheit The degree of approximation should be within about 15 percent to about 30 percent error. To account for the "glide" in the mixtures of refrigerant fluids, the "bubble point" pressure at a temperature of 70 degrees Fahrenheit should be around 10 percent higher than the pressure (gauge pressure, PSIG) of R-12. Increasing the mass fraction of components from GROUP-C and decreas- "reduced capacity" mixture of refrigerant fluids, the mass fraction of GROUP-C components may be reduce(by about 5 to about 15 weight percent Reduced capacity refrigerant mixtures will often perform poorly, but still useable) in normal systems. Air conditioning systems which were oversized when installed, may use a reduced capacity refrigerant to obtain a better equipment load match to the heat load. Properly sized air conditioning systems provide far better humidity control (longer run tires) than do oversized systems Condition 2

The resulting miscibility of mineral oils used in R-12 refrigeration systems with the mixture of refrigerant fluids created shall be great enough to provide for adequate circulation of said oils throughout the refrigeration circuit without undue trapping or "logging" of said oils in any part of the system as to not interfere with the proper operation of the refrigeration system in the range of desired temperatures. Increasing the mass fraction of components from GROUP-B in the mixture of refrigerant fluids will increase miscibility with R-12 compressor oils at a given temperature and vice-versa In general, about 4 to 5 weight percent (of the total refrigerant mixture) of highly flammable GROUP-B components seem to provide usable mineral oil return in most cases, especially when combined with other weakly flammable GROUP-B components. Highly flammable GROUP-B components can usually be increased to about 8 to about 10 weight percent if weak flammability can be tolerated. Lowering the highly flammable GROUP-B components to as low as about 1 weight percent of the total refrigerant mixture will compromise mineral oil miscibility, but will often result in a refrigerant which is useful under some conditions, such as high temperature air conditioning or household refrigerators which can tolerate poor oil return.
Condition 3

The resulting mixture of refrigerant fluids should be nonflammable or weakly flammable at worst. The maximum mass fraction of "very" flammable refrigerant fluid components will be limited to about 5 to about 10 percent. The maximum mass fraction of "weakly" flammable refrigerant fluid components will be limited to about 15 to about 60 percent. A test sample of the mixture of refrigerant fluids should be vapor leaked (fractionated) at several constant temperatures over the range of expected temperatures where the leaking may occur Some temperatures for fractionation testing would typically be −20, 0, 40, 70, 120, 180 degrees Fahrenheit Flammability tests should be conducted on the mass fractions of vapor and liquid phases and be analyzed with appropriate equipment (e.g. a gas chromatograph) at various points during each leak down to verify the mass fraction of flammable components does not become great enough to cause greater than "no" or "weak" flammability as desired. Flammability can also be reduced by placing the boiling point of a very or weakly flammable refrigerant fluid near a lesser flammable or nonflammable refrigerant fluid component with a similar boiling point. Total flammability may also be reduced by spreading out (by boiling point) the flammable components over the entire blend instead of using just one flammable component For the purposes of making the mixture of refrigerants of the preferred embodiments of the present invention, one needs to procure the following equipment, or equivalents. A mixing cylinder, which can be a standard refrigeration industry "recovery" cylinder or a small propane (20 pounds net weight propane) tank is needed. These are U.S. Department of Transportation (DOT) rated at 240 PSIG or higher. This tank (or cylinder) must be clean. Also needed is a refrigeration (or equivalent) vacuum pump, scales, and a refrigeration manifold set (hoses and gauges).

The air must be removed from the mixing cylinder with a vacuum pump, such as any used by refrigeration service technicians. A deep vacuum gauge is needed to verify that about a 200 micron vacuum is achieved on the mixing cylinder. Deep vacuum gauges which read to less than 25 microns are commonly available at refrigeration supply houses.

This mixing cylinder is placed on electronic charging scales, of the type commonly available to the refrigeration service technician. These scales often read in ½ ounce increments up to a total of 60 pounds or more total weight.

A refrigerant mixture is made, by connecting up each component supply cylinder to the mixing cylinder on scales, and weighing in the appropriate weight percentage of each component. The mixing hoses or manifolds should be purged or evacuated first to remove air and moisture. Each component supply cylinder should have a "dip tube" or eductor tube to withdraw the component in liquid phase. If the supply component cylinder does not have a dip tube, it must be inverted to obtain the component in liquid phase.

Although the components can be mixed in any order, 1 is easier to add the high boiling components first. The vacuum on the cylinder will usually be sufficient to draw in the required amount of the first component.

Some sort of liquid pump will be required to transfer the remaining GROUP-A and GROUP-B components as the pressure on the mixing cylinder will rise to match the supply cylinder.

Instead of a liquid pump, the mixing cylinder may be chilled by any convenient means by 10–20 degrees Fahrenheit colder than the supply cylinders. Alternately, the component supply cylinder may be heated 10–20 degrees Fahrenheit warmer than the mixing cylinder to facilitate the transfer. A hot water bath or cylinder heating blanket works nicely for this purpose.

When transferring GROUP-C components, no pump will be needed, as the higher pressures of GROUP-C components will (rapidly) transfer them to the mixing cylinder. Caution is advised, for after the relatively slow transfers for GROUP-A and GROUP-B components into the mixing cylinder, GROUP-C components will transfer very quickly, possibly surprising the person doing the mixing, and causing too much of a component to be transferred.

A refrigerant mixture, just completed, should be allowed to thermally stabilize or 12 hours or more before temperature and pressure measurements are taken, if needed. If static pressure and temperature measurements are not needed, a mixture may be charged into a refrigeration or air conditioning system and operated, without the 12 hour or more delay. A refrigerant mixture should always be unloaded from the mixing cylinder in liquid phase when charging into an appliance or other refrigeration system. This prevents fractionation from changing the composition of the mixture during charging. The mixing cylinder may contain a "dip tube" to provide for unloading in liquid phase. If a mixing cylinder is used without a dip tube, the cylinder must be inverted to unload in liquid phase.

If a mixture contains significant mass fractions of components with high molecular mass, the molecular mass of the total refrigerant mixture will increase. This may be beneficial for operation in centrifugal chiller refrigeration systems.

Extensive use of R-406A, described by U.S. Pat. No. 5,151,207, shows the mixture of refrigerants to be zeotropic, which means the composition changes during evaporation and condensation phases of refrigeration or air conditioning system operation. Unlike a single component refrigerant, such as R-12 zeotropic refrigerants do not evaporate or condense at a single temperature (for a given pressure), but they evaporate or condense over a small range or "glide" of temperatures Depending on the temperature, the glides involved for both R-406A and the preferred embodiments of the present invention are in the order of 10 to 15 degrees Fahrenheit.

Some refrigeration systems have seen performance improvements upwards of about 30 to about 40 percent due to the glide factor. Other systems exhibit similar performance to that of R-12. Events taking place in the condenser are broken down into 3 rough areas. The hot gas upon entering the condenser is first desuperheated, no condensation takes place in this area, just a relatively low amount of heat is rejected in cooling the hot gas down to the point where it is ready to condense. The second area involves the actual condensation of the gas, where a phase change occurs to liquid state A is, relatively high amount of heat is given off due to the phase change. Thirdly, the now liquid refrigerant is further cooled (called subcooling in the art), with a relatively low amount of heat rejected.

Zeotropic mixtures, such as those of the present invention, cause the condensation phase change area (and evaporation phase change area) to occupy more of the condenser (or evaporator), thus increasing the capacity of the condenser to reject or the evaporator to gain heat.

Oil miscibility may be tested by mixing refrigerant and oil samples in a glass tube refrigerant charging cylinder, such as a "Dial-a-Charger" or a smaller device called a "Vizi-vapor" charging device that can hold 2 or 3 fluid ounces of refrigerant oil mixtures. The sample is chilled to the desired temperature of operation and then observed for the oil separating from the refrigerant. Complete or almost complete separation is a sign that the oil and refrigerant may be immiscible at the sample temperature and oil return problems to the compressor might be expected. If the oil and refrigerant stay mixed or only separate only a small amount then oil miscibility at the tested temperature is assured. If a large amount of separation is observed, further testing needs to done, preferably in a real refrigeration system or refrigeration system test stand.

Oil miscibility can also be tested in a real system, by using a system with a compressor with an oil sight glass in the crankcase. Once the desired temperatures are reached, the oil level is observed, and if it drops, then it is probably not being returned from the evaporator, and a more miscible combination must be used. Sight glasses should also be present in critical areas of the system, where oil logging may occur (e.g., a low spot in the evaporator or the suction line) The few fluid ounces of oil needed to log an evaporator enough to interfere with system operation, may not cause an easily detectable loss of oil on the compressor crankcase sight glass due to all the foaming and churning in the crankcase from compressor operation, and hence the need to install sight glasses or other means of detecting oil logging in critical system areas Table 5 lists current ozone depletion potentials (ODPs) and global warming potentials (GWPs) of the components used in the following examples. ODP (ozone depletion potential) is calculated for mixtures by using June 1995 ARTI Refrigerant Database, reported ODPs of the individual component weight percentages. R-12 has an ODP of 1.0, the benchmark ODP. GWP (global warming potential) is calculated relative to CO2, from the same source. Each following example will list calculated ODP (as ODP=) and GWP (as GWP=) for the mixture of that example.

TABLE 5

| Refrigerant Fluid | ODP (100 year) | GWP (100 year to CO2) |
|---|---|---|
| R-12 | 1.0 | 7900 |
| R-22 | .050 (semi-empirical) | 1700 |
| R-142b | .066 (semi-empirical) | 2000 |
| R-124 | .030 (model-derived) | 480 |
| R-227ea | .000 | 3300 |
| R-E170 | .000 | 0 |
| R-600a | .000 | 0 |

EXAMPLE 1 (A MOST PREFERRED EMBODIMENT)

25 pounds of R-600a/142b/124/22 4/16.5/28.5/51 (ODP= 0.0449 GWP=1334), a "drop-in" substitute refrigerant for an R-12 automotive air conditioning system, were blended into a mixing cylinder (30 lb "disposable" DOT-39 cylinder manufactured by Worthington Cylinders) with a dip tube using the methods and procedures described above. Flammability suppression was desirable and the higher evaporator temperatures in a car (32 degrees Fahrenheit and above) resulted in good oil miscibility, even with higher percentages of R-124 (lower percentages of R-142b). There was less flammability suppression and more oil miscibility than in Example 2, below. The refrigerant mixture of this Example (minus the oil) has been found to be nonflammable, even after worst case vapor leakage (fractionation), at cold temperatures (−10 F. range), with worst cases (highest concentrations of flammables) points tested for flammability at 100 degrees Centigrade with methods specified by Underwriters Laboratories (UL) standard 2182.

Two pounds of the refrigerant mixture of Example 1 where charged into the air-conditioning system of a 1990 Pontiac Transsport minivan. Driving 35 mph at an ambient temperature of 80 degrees Fahrenheit, discharge air duct temperatures of 36 to 39 Fahrenheit were achieved. Controls were set to "MAX" (recirculate) and the highest fan speed. Low side (suction) pressure was 30 PSIG (set by the GM-V5 variable displacement compressor), high side (head) pressure was 150 PSIG. Later in the day, when the ambient temperature fell to 75 degrees Fahrenheit, the head pressure dropped to 125 PSIG, and the duct temperature rose to 39 to 42 degrees Fahrenheit.

The Example 1 refrigerant mixture was also charged into several taxicab vehicles in Florida for a two month test, and the company reported back good results. Additional testing at a technical school in Florida in stationary equipment, showed nearly identical results to R-406A.

The Example 1 refrigerant mixture was run in an oil miscibility test stand, a real refrigeration system, described in appendix A Evaporator and suction line sight glasses showed the refrigerant/oil mixtures becoming cloudy in the range of −25 to −30 degrees Fahrenheit, a sign that refrigerant/oil miscibility is starting to be lost The mineral oil used was Suniso 3GS 150 viscosity, the type commonly found in stationary R-12 refrigeration equipment Oil return to the compressor was still acceptable after 48 hours of running at −40 degrees Fahrenheit on the evaporator.

Automotive compressor mineral oil, Suniso 5GS 525 viscosity, was also tested and found to go cloudy at around 15 degrees Fahrenheit. A 4 hour run showed this thicker oil still returned acceptably at around 5 degrees Fahrenheit This is enough miscibility for automotive air conditioning systems, where evaporator temperatures are 25 degrees Fahrenheit or higher.

The Example 1 refrigerant mixture offers roughly 20 percent less ozone depletion and about 25 percent less global warming than does R46A. Example 1 refrigerant mixture offers about 96 percent less ozone depletion and about 83 percent less global warming than R-12.

| | | |
|---|---|---|
| R-600a/142b/124/22 | 4/16.5/28.5/51 | ODP = .0449 GWP = 1334 (Example 1) |
| R-600a/142b/22 | 4/41/55 | ODP = .0546 GWP = 1755 (R-406A for comparison) |
| R-12 (pure) | 100 | ODP = 1.000 GWP = 7900 (R-12 for comparison) |

EXAMPLE 2

R-600a/142b/124/22 4/13/33/50, a "drop-in" substitute refrigerant mixture for an R-12 automotive air conditioning system, is created in the manner set forth in Example 1 above. Flammability suppression is desirable and the higher evaporator temperatures in a car (32 degrees Fahrenheit and above) results in good oil miscibility, even with higher percentages of R-124 (lower percentages of R-142b). The blend in this Example was computer simulated with NIST program REFPROP V4.0 and showed good results.

Compared to R-406A, the Example 2 refrigerant mixture offers about 20 percent lower ozone depletion and about 30 percent less global warming.

| | | |
|---|---|---|
| R-600a/142b/124/22 | 4/13/33/50 | ODP = .043 GWP = 1268 (Example 2) |
| R-600a/142b/22 | 4/41/55 | ODP = .0546 GWP = 1755 (R-406A for comparison) |

EXAMPLE 3

R-600a/142b/124/22 4/34/7/55, a "drop-in" suite for R-12 in a walk-in freezer, operating at −20 degrees Fahrenheit, is created in the manner set forth in Example 1 above. Due to the low evaporator temperature, oil miscibility is of paramount importance. A higher percentage of R-142b and a lower percentage of R-124 are used. Computer simulations showed good results.

The Example 3 refrigerant mixture offers about same ozone depletion and global warming as R-406A. Any weak flammability which might result from a vapor leak of R-406A under cold temperatures is reduced.

| | | |
|---|---|---|
| R-600a/142b/124/22 | 4/34/7/55 | ODP = .052 GWP = 1648 (Example 3) |
| R-600a/142b/22 | 4/41/55 | ODP = .0546 GWP = 1755 (R-406A for comparison) |

EXAMPLE 4 (A MOST PREFERRED EMBODIMENT)

R-600a/142b/227ea/22 4/15/40/41, a "drop-in" substitute refrigerant for an R-12 automotive air conditioning system, is created in the manner set forth in Example 1 above. A high percentage of R-227ea is used and some flammability suppression is provided in the event of a collision where refrigerant lines are ruptured and compressor oil is sprayed onto hot exhaust manifolds or the catalytic converter The mixture also has a lower ODP than other Examples. This refrigerant mixture has been computer simulated using NIST REFPROP V4.0 and showed favorable results.

Example 4 offers almost one half the ozone depletion of R-406A (97 percent less ODP than R-12), however, the global warming potential is about 25 percent greater than R-406A.

| | | |
|---|---|---|
| R-600a/142b/227ea/22 | 4/15/40/41 | ODP = .03 GWP = 2317 (Example 4) |
| R-600a/142b/22 | 4/41/55 | ODP = .0546 GWP = 1755 (R-406A for comparison) |

Two cylinders, each containing 25 pounds of the Example 4 refrigerant mixture, were made in the manner set forth above. About two pounds of the Example 4 refrigerant mixture were charged into the oil miscibility test stand described in Appendix A. Oil return to the compressor was slightly worse than for the refrigerant mixture of Example 1. Oil return was still adequate down into the −20 to −30 degree Fahrenheit range. Suniso 3GS (150 viscosity) mineral oil was used.

2.5 pounds of the Example 4 refrigerant mixture were charged into a Nor-Lake brand 4 door chest type cooler made for R-12 refrigerant. This unit is at least 30 years old and had been out of service (leaks and dirty condenser coil) for two years (R-12). The unit was first cleaned up and repaired and charged with R-406A refrigerant mixture to verify operation. The R-406A refrigerant mixture was removed before charging in the Example 4 refrigerant mixture. The cooler ran normally. Ambient temperature was about 78 degrees Fahrenheit, and upon initial startup, the head pressure was 148 PSIG, and the suction pressure was 40 PSIG. After sixteen minutes, the unit had cooled down and cycled oft, with the head pressure being 128 PSIG and the suction pressure being 21 PSIG at the end of the cycle.

EXAMPLE 5

R-600a/142b/124/227ea/22 4/15/17/20/44, a "drop-in" substitute refrigerant for an R-12 automotive air conditioning system of the following mixture is created in the manner set forth in Example 1 above. More nonflammables are delivered at higher boiling points than Example 4 in the case of a system rupture. This mixture has been computer simulated using NIST REFPROP V4.0 with good results.

Example 5 is a compromise between Examples 1 and 4. Ozone depletion is reduced about one third R-406A with similar global warming to R-406A.

| | | |
|---|---|---|
| R-600a/142b/124/227ea/22 | 4/15/17/20/44 | ODP = .037 GWP = 1789 (Example 8) |
| R-600a/142b/22 | 4/41/55 | ODP = .0546 GWP = 1755 (R-406A for comparison) |

EXAMPLE 6

R-E170/142b/124/22 4/16.5/28.5/51 (ODP=0.0449 GWP=1334), a "drop-in" substitute for R-12, was created in the manner set forth in Example 1, above. It is the same as Example 1, except that Dimethyl ether (R-E170) has been substituted for the isobutane (R-600a), which created an equivalent refrigerant R-E170 has good mineral oil miscibility, as does isobutane. The temperature-pressure curve almost exactly matches that of Example 1 (See FIG. 1).

A cylinder containing 25 pounds of the Example 6 refrigerant mixture was made in the manner set forth above. About 8 ounces (weight) of Example 6 refrigerant mixture were charged into a Kelvinator model FDK190KNH2 household refrigerator. The refrigerator was started at room temperature (about 70 degrees Fahrenheit). After 30 minutes of operation, pressures, and the compressor Ampere draw were normal. Suction pressure was 2 PSIG, head pressure was 125 PSIG, and the compressor current draw was 2.2 Amperes (current draw with R-12 was also 22 Amperes). Inside freezer compartment was 20 degrees Fahrenheit and the fresh food compartment was at 36 degrees Fahrenheit. However, the service technician noted that the condenser inlet was hotter to the touch than it would have been with R-12. This is due to the higher heat of compression of the R-22 component. R-406A exhibits slightly higher compressor discharge temperatures than R-12 also. The slightly higher discharge temperatures are well within equipment operating capabilities and cause no problems. The "frost line" was at the end of the evaporator.

EXAMPLE 7

4 pounds of the Example 6 refrigerant mixture were charged into the R-12 air conditioning system on a 1985

MACK "cabover" semi tractor. The system performed identical to factory specifications for this system charged with R-12. Design suction pressure range was 18 to 25 PSIG (at 2000 RPM, 80 degrees Fahrenheit ambient), the system with the Example 6 refrigerant mixture ran at about 19 to 20 PSIG on the suction side. Design head pressure range (with R-12) is 250-275 PSIG with 260 PSIG being measured when operating on the Example 9 refrigerant mixture.

EXAMPLE 8

A "Masterbuilt" brand chest type cooler was also charged with 9.0 ounces (weight) of the Example 6 refrigerant mixture. It used a thermostatic expansion valve (TEV) refrigerant metering device. After 15 minutes of operation, the suction pressure was 40 PSIG and the head pressure was 130 PSIG, with the food compartment temperature being 35 degrees Fahrenheit. Compressor current draw with the Example 6 refrigerant mixture was 1.8 Amperes (1.9 Amperes for R-12). The refrigerant sight glass was clear (no bubbles). The "frost line" was at the end of the evaporator.

EXAMPLE 9

A Frige-Air brand display case model LKC2680 (TXV refrigerant metering device) was charged with 6 ounces (weight) of the Example 6 refrigerant mixture. The "pull down" (cool down until unit cycled off) for this unit was 18 minutes for both R-12 and the Example 6 refrigerant mixture. The food compartment temperature at the end of the cool down time was 34 degrees Fahrenheit for the Example 9 refrigerant mixture and 40 degrees Fahrenheit for R-12. The refrigerant sight glass was clear (no bubbles) and the "frost line" was at the end of the evaporator. Compressor current draw as 1.9 Amperes for both the Example 6 refrigerant mixture and R-12. A higher condenser inlet temperature (compressor discharge) was also observed by feel.

Additional Refrigerant Mixtures

Additional refrigerant mixtures are created in the manner set forth above from components in Tables 1–3 using Conditions 1–3. Some of the mixtures may not be the best performers nor have the best mineral oil miscibility, but they should be functional in at least some types of R-12 refrigeration or airconditioning systems as a "drop-in" replacement for R-12.

EXAMPLE 10

R-600a/124/134a/22 6/26/40/28
Poor oil miscibility, may only work for high temperature systems, such as cars. Dilution by R-134a also reduces the glide (and performance).

EXAMPLE 11

R-227ea/22 75/25
Very poor oil miscibility, might work in some cars. Would work if oil was changed to alkylbenzene.

EXAMPLE 12

R-124/142b/125 47/15/38
Poor oil miscibility, low critical temperature, may work in high temperature systems (cars). Temperature-pressure curve is OK. Low critical temperature may generate high head pressures and loss of performance in hot climates or stopped traffic.

EXAMPLE 13

R-600a/142b/124/22 1.5/9.5/39/50
Very good flammability suppression at elevated temperatures, but very poor miscibility in mineral oil This will only be useful in high temperature air conditioning systems, such as some cars, and household refrigerators which can tolerate almost zero mineral oil refrigerant miscibility. Certain cars, with compressors mounted higher than the evaporator and using a small oil charge may see oil starvation due to poor oil return.

EXAMPLE 14

R-600a/142b/124/218 4/8/13/75
Low critical temperature, but will still perform better than R-134a. Good oil miscibility. The U.S. EPA currently takes a dim view of perfluorinated fluorocarbons (R-218) since they are so stable and do not easily break down in the atmosphere for thousands of years, adding to global warming. This thinking might change in the future as more is learned about the global warming mechanisms.

EXAMPLE 15

R-600a/124/134a/22 6/26/40/28
Improvement to FRIGC™ FR12™, increase oil miscibility, and capacity. This mixture may work about the same as R-12 but not as good as a mixture with a higher glide, such as R-406A or a preferred embodiment of the present invention. This embodiment will have better oil miscibility than does FR-12™, but it is still very limited, and useful only for high temperature systems.

EXAMPLES 16–113

Additional refrigerant mixtures of the present invention of Examples 16–113 are summarized in Table 6, below. For completeness, Examples 1–15 are also included in Table 6. Most of the refrigerant mixtures in Table 6 were computer simulated with NIST program REFPROP V4.0 and showed good results. General comment(s) are included for each entry in Table 6. The "fig." column refers to the figure number containing the temperature-pressure chart for the blend. The word "oil" in Table 6 is meant to mean "mineral oil used in R-12 refrigeration and air conditioning systems". Oil miscibility (ability of the oil to correctly return to the compressor is given a letter "grade" of A to F defined as follows:

A No problems with mineral oil return (150 viscosity) down to −50 degrees Fahrenheit or colder evaporator temperatures.

B No problems with mineral oil (150 viscosity) return down to about −30 degrees Fahrenheit evaporator temperatures.

C No problems with mineral oil (150 viscosity) return for most R-12 systems down to about −10 to about 10 degrees Fahrenheit. A small number of systems may log oil or fail from poor oil return even at about 10 degrees Fahrenheit evaporator temperatures.

D Only usable in some systems, and only for "high temperature" (air conditioning, about 35 degrees Fahrenheit and warmer) use. Due to small line sizes (high suction gas velocities), many R-12 household refrigerators would still be usable, but not R-12 "commercial refrigeration" systems.

F Total mineral oil immiscibility with the refrigerant. Only a very few systems, probably "household" refrigerators, would be able to operate correctly. Pure R-134a (in mineral oil) is a good example of "F". It is outside the scope of the present invention to claim a refrigerant mixture with no miscibility in mineral oil, therefore, no examples are included with a mineral oil miscibility of "F" in Table 6, below.

TABLE 6

| Example | components | Composition | oil | FIG. | General comments |
|---|---|---|---|---|---|
| 1 | R-600a/142b/124/22 | 4/16.5/28.5/51 | A− | 1 | preferred embodiment, best overall refrigerant |
| 2 | R-600a/142b/124/22 | 4/13/33/50 | B+ | 2 | slightly lower oil miscibility, better flammability suppression |
| 3 | R-600a/142b/124/22 | 4/34/7/55 | A | 2 | might fractionate to slightly flammable (vapor leaking) |
| 4 | R-600a/142b/227ea/22 | 4/15/40/41 | B | 2 | preferred embodiment, more costly, less oil misc than Example 1 |
| 5 | R-600a/142b/124/227ea/22 | 4/15/17/20/44 | B | 2 | combination of Example 1 and Example 4 |
| 6 | R-E170/142b/124/22 | 4/16.5/28.5/51 | A− |  | Equivalent to Example 1 except using R-E170 instead of R-600a |
| 7 thru 9 | same refrigerant as Example 6 |  |  |  |  |
| 10 | R-600a/124/134a/22 | 6/26/40/28 | C− | 2 | reduced glide (dilution by 134a) compared to Example 1 |
| 11 | R-227ea/22 | 75/25 | D− | 3 | very bad oil misc, excellent fire suppression |
| 12 | R-124/142b/125 | 47/15/38 | D | 3 | poor oil misc. glide too high |
| 13 | R-600a/142b/124/22 | 1.5/9.5/39/50 | D+ | 3 | good flammability suppression, but poor oil miscibility |
| 14 | R-600a/142b/124/218 | 4/8/13/75 | C− | 3 | R-218 is PFC, currently banned by USEPA for refrigerants |
| 15 | R-600a/124/134a/22 | 6/26/40/28 | C− | 3 | poor oil return, to D+ after vapor leaking |
| 16 | R-600a/124/134a/143a | 6/40/26/28 | D+ | 4 | poor oil return |
| 17 | R-600a/124/134a/143a/125 | 6/40/26/14/14 | D+ | 4 | poor oil return |
| 18 | R-600a/124/134a/143a/125/1216 | 6/40/16/14/14/10 | A |  | weakly flammable, oil misc to D+ after vapor leaking |
| 19 | R-600a/124/134a/143a/290 | 3/44/26/24/3 | D | 4 | poor oil return |
| 20 | R-600a/124/134a/290/22 | 3/40/26/3/28 | D+ | 4 | poor oil return |
| 21 | R-142b/124/134a/290/22 | 15/15/26/4/40 | B+ | 5 | oil misc will degrade to C− or D+ after vapor leaking |
| 22 | R-E143a/E170/124/142b/22 | 5/5/28/12/50 | B+ |  | limited availability of R-E143a |
| 23 | R-227ea/142b/22 | 40/20/40 | D | 5 | expensive (227ea), poor oil misc |
| 24 | R-600a/142b/124/22 | 4/14.5/20.5/61 | B+ | 5 | "high performance" version of Example 1 (higher pressures) |
| 25 | R-290/142b/22 | 5/46/49 | A | 5 | weakly flammable, oil misc to C after vapor leaking |
| 26 | R-290/142b/22/600a | 2/44/51/3 | A | 5 | weakly flammable after vapor leaking |
| 27 | R-600a/142b/124/22/290 | 4/16/32/44/4 | A | 6 | good refrigerant, slight decrease in oil misc upon vapor leak to B+ |
| 28 | R-600a/142b/124/22/1270 | 4/16/33/43/4 | A |  | good refrigerant, slight decrease in oil misc upon vapor leak to B+ |
| 29 | R-600a/142b/124/E125/290 | 4/16/33/43/4 | A |  | good refrigerant, slight decrease in oil misc upon vapor leak to B+ |
| 30 | R-600a/142b/124/E125/1270 | 4/16/32/44/4 | A |  | good refrigerant, slight decrease in oil misc upon vapor leak to B+ |
| 31 | R-600a/142b/125/290 | 4/49/43/4 | A | 6 | weakly flammable after vapor leaking, high glide |
| 32 | R-600a/142b/125/1270 | 4/50/42/4 | A |  | weakly flammable after vapor leaking, high glide |
| 33 | R-600a/142b/22/125/290 | 4/45/24/23/4 | A | 6 | weakly flammable after vapor leaking, slightly higher glide |
| 34 | R-600a/142b/22/125/1270 | 4/46/24/22/4 | A |  | weakly flammable after vapor leaking, slightly higher glide |
| 35 | R-600a/142b/134a/22/290 | 4/35/10/46/5 | A | 6 | oil misc slight decrease to B+ on vapor leak, reduced glide |
| 36 | R-600a/142b/134a/22/1270 | 4/36/10/45/5 | A |  | oil misc slight decrease to B+ on vapor leak, reduced glide |
| 37 | R-600a/124/22/290 | 4/52/40/4 | B− | 7 | oil misc decrease to C− on vapor leaking |
| 38 | R-600a/124/22/1270 | 4/53/39/4 | B− |  | oil misc decrease to C− on vapor leaking |
| 39 | R-600a/124/134a/22 | 4/37/20/39 | D+ | 7 | low glide, low oil misc. |
| 40 | R-600a/227ea/22/290 | 4/65/27/4 | B− | 7 | expensive (227ea), oil misc degrades to D+ after vapor leaking |
| 41 | R-600a/245cb/22/290 | 4/63/29/4 | B− | 7 | expensive (245cb), oil misc degrades to D+ after vapor leaking |
| 42 | R-600a/227ea/22/290/134a | 4/55/17/4/20 | C+ | 7 | expensive (227ea) |
| 43 | R-E170/600a/142b/22 | 2/2/41/55 | A |  | weakly flammable after vapor leaking |
| 44 | R-600a/E170/142b/124/22 | 2/2/17/29/50 | A− |  | equivalent to Example one, some R-600a replaced with R-E170 |
| 45 | R-E170/142b/22/290 | 4/41/51/4 | A+ |  | might be weakly flammable, oil misc goes to A− vapor leaking |
| 46 | R-E170/142b/124/22/290 | 4/17/29/46/4 | A |  | oil misc goes to A− after vapor leaking |
| 47 | R-E170/227ea/22 | 4/71/25 | D |  | expensive (227ea), poor oil misc |
| 48 | R-E170/227ea/125/143a/290 | 4/54/20/18/4 | C+ |  | expensive (227ea), oil misc drops to C− after vapor leaking, 0 ODP |
| 49 | R-E170/227ea/134a/125/290 | 4/52/20/20/4 | C+ |  | expensive (227ea), oil misc drops to C− after vapor leaking, 0 ODP |
| 50 | R-600a/227ea/134a/143a/290 | 4/54/20/18/4 | C+ | 8 | expensive (227ea), oil misc drops to C− after vapor leaking, 0 ODP |
| 51 | R-600a/227ea/134a/125/290 | 4/52/20/20/4 | C+ | 8 | expensive (227ea), oil misc drops to C− after vapor leaking, 0 ODP |
| 52 | R-E227ca2/600a/218/290 | 27/4/65/4 | C− |  | oil goes to D− after vapor leaking, R-218 not EPA approved |
| 53 | R-C318/E170/218/290 | 28/4/64/4 | C− |  | oil goes to D− after vapor leaking, R-C318, 218 not EPA approved |
| 54 | R-E227ca2/600a/218/1270 | 29/4/63/4 | C− |  | oil goes to D− after vapor leaking, R-218 not EPA approved |
| 55 | R-600a/142b/E125 | 4/41/55 | A |  | weakly flammable after vapor leaking |
| 56 | R-600a/142b/E125/290 | 2/41/55/2 | A |  | weakly flammable, oil misc to B+ after vapor leaking |
| 57 | R-600a/142b/125 | 4/46/50 | A | 8 | weakly flammable after vapor leaking, high glide |
| 58 | R-600a/142b/124/125 | 4/18/32/46 | A− | 8 | similar to Example 1, but higher glide |
| 59 | R-600a/142b/124/125/290 | 4/18/32/42/4 | A | 9 | oil goes to A− after vapor leaking |
| 60 | R-600a/227ea/125 | 4/69/27 | D | 9 | expensive (227ea), poor oil misc, good glide, zero ODP |
| 61 | R-E170/227ea/125 | 4/69/27 | D | 9 | expensive (227ea), poor oil misc, good glide, zero ODP |
| 62 | R-600a/124/134a/125/290 | 3/42/26/26/3 | C− | 9 | oil misc will drop to D after vapor leaking |
| 63 | R-600a/142b/227ea/22 | 4/15/30/51 | B | 9 | "high performance" version of Example 4 (higher pressures) |
| 64 | R-E170/142b/124/22 | 4/14.5/20.5/61 | B+ |  | "high performance" version of Example 8 (higher pressures) |
| 65 | R-600a/142b/124/22/290 | 4/16/22/54/4 | A | 9 | "high performance" version of Example 30 (higher pressures) |
| 66 | R-600a/124/22/290 | 6/48/42/4 | B+ | 10 | oil misc drops to B− on vapor leaking |
| 67 | R-600a/124/125 | 8/51/41 | B− | 10 | high glide |
| 68 | R-600a/124/22 | 8/45/47 | B | 10 | worse oil misc and lower critical temp than R-406A |
| 69 | R-600a/142b/124/22 | 3/18/24/55 | B+ | 10 | pressures between "normal" and "high performance" use |
| 70 | R-600a/124/125/290 | 6/54/36/4 | B+ | 10 | oil misc drops to B− on vapor leaking, higher glide than Ex. 66 |
| 71 | R-E170/124/125 | 8/51/41 | B− |  | high glide |
| 72 | R-E170/124/22 | 8/45/47 | B |  | worse oil misc and lower critical temp than R-406A |
| 73 | R-E170/124/22/290 | 6/48/42/4 | B+ |  | oil misc drops to B− on vapor leaking |
| 74 | R-E170/124/125/290 | 6/54/36/4 | B+ |  | oil misc drops to B− on vapor leaking, high glide |
| 75 | R-600a/227ea/124/125 | 8/30/27/35 | B | 11 | expensive (227ea) |
| 76 | R-600a/142b/227ea/124/125 | 5/16/22/18/39 | B+ | 11 | less expensive to make than Example 75 |
| 77 | R-600a/142b/227ea/125 | 5/16/41/38 | B+ | 11 | expensive (227ea), Mol. weight may be high enough for chillers |
| 78 | R-600a/227ea/125/290 | 5/70/21/4 | B+ | 11 | expensive (227ea), low critical temp, high glide, zero ODP |
| 79 | R-E170/227ea/125/290 | 5/70/21/4 | B+ |  | expensive (227ea), low critical temp, high glide, zero ODP |

TABLE 6-continued

| Example | components | Composition | oil | FIG. | General comments |
|---|---|---|---|---|---|
| 80 | R-E170/142b/125/290 | 4/49/43/4 | A | | weakly flammable |
| 81 | R-142b/125 | 53/47 | D+ | 11 | weakly flammable after vapor leaking, high glide |
| 82 | R-142b/125/290/134a | 47/38/5/10 | A | 12 | weakly flammable, oil drops to C−/D+ on vapor leaking |
| 83 | R-142b/125 | 43/57 | D+ | 12 | weakly flammable after vapor leaking, high glide, high performance |
| 84 | R-142b/125/290 | 52/43/5 | A | 12 | weakly flammable, oil goes to C−/D+ after vapor leaking, high glide |
| 85 | R-142b/143a | 57/43 | D+ | 12 | weakly flammable, high glide |
| 86 | R-600a/124/125/290 | 6/44/46/4 | B+ | 12 | high performance version of Example 70 |
| 87 | R-124/143a | 68/32 | D− | 13 | very marginal mineral oil misc. |
| 88 | R-E170/227ea/143a | 5/70/25 | C− | | zero ODP |
| 89 | R-600a/227ea/143a | 5/70/25 | C− | 13 | zero ODP |
| 90 | R-600a/124/125/1270 | 6/55/35/4 | B+ | | oil misc drops to B− on vapor leaking, higher glide than Ex. 66 |
| 91 | R-E170/124/22/1270 | 6/49/41/4 | B+ | | oil misc drops to B− on vapor leaking |
| 92 | R-E170/124/125/1270 | 6/55/35/4 | B+ | | oil misc drops to B− on vapor leaking |
| 93 | R-600a/227ea/125/1270 | 5/71/20/4 | B+ | | expensive (227ea), low critical temp, high glide, zero ODP |
| 94 | R-E170/227ea/125/1270 | 5/71/20/4 | B+ | | expensive (227ea), low critical temp, high glide, zero ODP |
| 95 | R-E170/142b/125/1270 | 4/50/42/4 | A | | weakly flammable |
| 96 | R-142b/125/1270/134a | 47/38/5/10 | A | | weakly flammable, oil misc drops C−/D+ on vapor leaking |
| 97 | R-142b/125/1270 | 53/42/5 | A | | weakly flammable, oil goes to C−/D+ after vapor leaking, high glide |
| 98 | R-600a/142b/124/22 | 8/14.5/26.5/51 | A+ | 13 | Ex 1 with more isobutane, weakly flammable, still usable |
| 99 | R-600a/142b/124/22 | 2/17.5/29.5/51 | C | 13 | Ex 1 with less R-600a, worse oil miscibility, usable in some systems |
| 100 | R-600a/142b/124/22 | 4/21.5/23.5/41 | B | 13 | Ex 1 with less R-22, lower pressures, usable in some systems |
| 101 | R-600a/142b/124/22 | 4/9/21/66 | C+ | 14 | Ex 1 with more R-22, higher pressures, usable in some systems |
| 102 | R-600a/142b/227ea/22 | 8/13/38/41 | A− | 14 | Ex 4 with more isobutane, weakly flammable, still usable |
| 103 | R-600a/142b/227ea/22 | 2/16/41/41 | C− | 14 | Ex 4 with less R-600a, worse oil miscibility, usable in some systems |
| 104 | R-600a/142b/227ea/22 | 4/20/45/31 | A− | 14 | Ex 4 with less R-22, lower pressures, usable in some systems |
| 105 | R-600a/142b/227ea/22 | 4/8/32/56 | C+ | 14 | Ex 4 with more R-22, higher pressures, usable in some systems |
| 106 | R-E170/142b/124/22 | 8/14.5/26.5/51 | A+ | | Ex 6 with more DME, weakly flammable, still usable |
| 107 | R-E170/142b/124/22 | 2/17.5/29.5/51 | C | | Ex 6 with less DME, worse oil miscibility, still usable in some systems |
| 108 | R-E170/142b/124/22 | 4/21.5/23.5/41 | A | | Ex 6 with less R-22, lower pressures, usable in some systems |
| 109 | R-E170/142b/124/22 | 4/9/21/66 | B− | | Ex 6 with more R-22 higher pressures, usable In some systems |
| 110 | R-600a/142b/124/125 | 8/16/30/46 | A | 15 | Ex 58 with more isobutane, weakly flammable, still usable |
| 111 | R-600a/142b/124/125 | 2/19/33/46 | C | 15 | Ex 58 with less isobutane, worse oil misc, usable in some systems |
| 112 | R-600a/142b/124/125 | 4/23/37/36 | A− | 15 | Ex 58 with less R-125, lower pressures, usable in some systems |
| 113 | R-600a/142b/124/125 | 4/11/24/61 | C− | 15 | Ex 58 with more R-125, higher pressures, usable in some systems |

There exist thousands of possible combinations and permutations from the refrigerant fluids listed in Tables 1–3 that could produce a refrigerant substitute for R-12. Many combinations can be ruled out under conditions 1,2, and 3 listed above. Other combinations may still provide a good refrigerant, but may not be currently environmentally acceptable, but they may become acceptable in the future as new evidence and understanding of the environment proceeds. In general, higher temperature applications (above 32 degrees Fahrenheit and above such as automotive air conditioning) may work with R-12 substitutes that have poor or marginal oil miscibility, whereas the same substitute may prove unacceptable in lower temperature applications such as freezers or refrigerators. Other combinations from Tables 1–3 may produce R-12 "drop-in" substitutes that have low critical temperatures, below about 215 degrees Fahrenheit, and still provide satisfactory performance in the majority of climates, but prove unsatisfactory in extreme heat or very high humidity climates.

For any given combination of components, from Tables 1–3, above, that produce a useable "drop-in" substitute for R-12, many permutations (ranges) of each component's weight percentage are possible. Work to date has shown that highly flammable GROUP-B oil miscibility improvers (isobutane, dimethyl ether, propane, etc) still provide some oil miscibility improvement in concentrations as low as about 1 weight percent (see discussion in Condition 2, above). Highly flammable GROUP-B components may be further increased to about 10 weight percent if a weakly flammable refrigerant can be tolerated, giving a range of about 1 to 10 weight percent in most cases for a useable "drop-in" substitute for R-12. GROUP-C components (see discussion in Condition 1, above), may be vaned over the range of about −10 to +15 weight percent from their "normal centerline" values used to create a normal temperature-pressure curve. This allows for special uses such as "low capacity" and "high capacity" refrigerant mixtures. Adjustment of weight percentages of GROUP-C components, must be accompanied by a corresponding opposite adjustment in GROUP-A components so that the total of all weight percentages remains at 100 percent. Examples 98–113 in Table 6, above, illustrate component ranges applied to Examples 1, 4, and 6, also in Table 6.

Appendix A

The oil miscibility test stand consists of:

A refrigeration test stand built from a new two-ton medium temperature R-12 semi-nermetic Copeland compressor, model EAL2-0200CAB. A standard two ton condenser (R-22) and fan were salvaged from a residential central air conditioning system. The oil test stand is a standard refrigeration system consisting of a compressor, a condenser, a refrigerant metering device (manual expansion valve) and an evaporator. The object of said test stand is to try to force oil logging (poor oil return) to occur in order to evaluate the oil return capabilities of test refrigerant mixtures under worst case conditions.

The evaporator is a 50 foot coil of ⅝" refrigeration copper tubing, in free air, with no fan or fins. The coil diameter is around 14 inches and is spread out to be about 2½ feet deep. The centerline of the coil is parallel to the ground, providing each loop (11 of them) a chance to "trap" oil. There are six refrigeration sight glasses, or viewing ports in the refrigeration circuit They are located, in the liquid fire, just before the refrigerant metering (expansion) needle valve, just after the metering valve, midway in the evaporator, at the bottom of the center turn of pipe, at the evaporator outlet, in the center of the 6 foot vertical riser ⅞ suction line, and in the center of the 6 foot horizontal suction line run.

Evaporator heat can be provided from direct electric heating of the coil, up to 310 Amps, approximately 5 volts from a variable DC power supply. The liquid line has a 1 foot rubber hose (automotive barrier hose) segment to block current flow through the condenser and compressor.

The (hand operated) metering device is a multiturn needle valve, approximately 4 tons capacity wide open.

The suction line, is a 6 foot piece of 7/8" vertical (straight up) copper, followed, by a 6 foot horizontal run (also 7/8"). The horizontal run has a "low spot", about 1 inch lower than the ends, for oil to collect in (and a sight glass). There is also a manual EPR (evaporator pressure regulator-ball valve, with 3/4" opening), with low side gauges on either side of the valve.

What is claimed is:

1. A mixture of refrigerants that is a drop-in substitute for dichlorodifluoromethane in dichlorodifluoromethane refrigeration systems, comprising isobutane (R-600a) is present in about 3 weight percent, 1-chloro-1,1-difluoroethane (R-142b) is present in about 18 weight percent, 2-chloro-1,1,2-tetrafluoroethane (R-124) is present in about 24 weight percent, and chlorodifluoromethane (R-22) is present in about 55 weight percent, the weight percentages of said components being weight percentages of the overall mixture.

2. The method for producing refrigeration in a refrigeration system comprising employing as a refrigerant a composition comprising isobutane (R-600a) present in about 3 weight percent, 1-chloro-1,1-difluoroethane (R-142b) present in about 18 weight percent, 2-chloro-1,1,1,2-tetrafluoroethane (R-124) present in about 24 weight percent, and chlorodifluoromethane (R-22) present in about 55 weight percent, the weight percentages of said components being weight percentages of the overall mixture.

* * * * *